United States Patent
Bernier et al.

(10) Patent No.: US 10,450,968 B2
(45) Date of Patent: Oct. 22, 2019

(54) VEHICLE OPERATION SYSTEM AND METHOD

(71) Applicant: BOMBARDIER RECREATIONAL PRODUCTS INC., Valcourt (CA)

(72) Inventors: Michel Bernier, Sherbrooke (CA); Benoit Pion, Valcourt (CA); Pierre-Luc Milot, Saint-Denis-de-Brompton (CA); Jean-Sebastien Pard, Tingwick (CA); Michel Lefebvre, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 961 days.

(21) Appl. No.: 14/875,957

(22) Filed: Oct. 6, 2015

(65) Prior Publication Data

US 2016/0025016 A1 Jan. 28, 2016

Related U.S. Application Data

(60) Division of application No. 14/584,403, filed on Dec. 29, 2014, now Pat. No. 9,683,492, which is a
(Continued)

(51) Int. Cl.
*F02D 9/02* (2006.01)
*F02D 11/04* (2006.01)
(Continued)

(52) U.S. Cl.
CPC ............... *F02D 9/02* (2013.01); *B62M 9/06* (2013.01); *B62M 27/02* (2013.01); *F02D 11/04* (2013.01);
(Continued)

(58) Field of Classification Search
CPC . F02D 9/02; F02D 11/04; F02D 11/10; F02D 2009/0277; F02D 2011/102; B62M 9/06; B62M 27/02; B62M 2027/023
See application file for complete search history.

(56) References Cited

U.S. PATENT DOCUMENTS 5,957,230 A 9/1999 Harano et al.
6,352,045 B1 3/2002 Takashima
(Continued)

FOREIGN PATENT DOCUMENTS

CN 1287071 A 3/2001
CN 1496908 A 5/2004
(Continued)

OTHER PUBLICATIONS

English abstract of CN1287071A, retrieved from https://worldwide.espacenet.com/ on Sep. 2, 2016.
(Continued)

*Primary Examiner* — Grant Moubry
(74) *Attorney, Agent, or Firm* — BCF LLP

(57) ABSTRACT

A snowmobile includes a frame with a tunnel, a fuel tank disposed thereon and an engine connected thereto. A throttle body fluidly communicates with the engine. A throttle valve is disposed in the throttle body for regulating fluid flow through the throttle body into the engine, a position of the throttle valve being movable between an open position and a closed position. A throttle operator connected to the frame to control the position of throttle valve is moveable between an idle position and a drive position. A throttle valve actuator operatively connected to the throttle valve and the throttle operator controls a position of the throttle valve based at least in part on the throttle operator position, the throttle valve actuator being an electric throttle valve actuator and disposed longitudinally between the fuel tank and the engine. Vehicles and methods of operating the vehicles are also disclosed.

13 Claims, 20 Drawing Sheets

Related U.S. Application Data continuation-in-part of application No. PCT/US2013/048803, filed on Jun. 29, 2013.

(60) Provisional application No. 61/768,285, filed on Feb. 22, 2013, provisional application No. 61/758,322, filed on Jan. 30, 2013, provisional application No. 61/666,443, filed on Jun. 29, 2012.

(51) Int. Cl.
  *B62M 9/06* (2006.01)
  *B62M 27/02* (2006.01)
  *F02M 35/16* (2006.01)
  *F02N 11/10* (2006.01)
  *F02D 11/10* (2006.01)

(52) U.S. Cl.
  CPC ........... *F02D 11/10* (2013.01); *F02M 35/162* (2013.01); *F02N 11/101* (2013.01); *B62M 2027/023* (2013.01); *F02D 2009/0277* (2013.01); *F02D 2011/102* (2013.01)

(56) References Cited

U.S. PATENT DOCUMENTS

| | | | | |
|---|---|---|---|---|
| 6,454,037 | B1* | 9/2002 | Atsuumi | B62M 27/02 180/186 |
| 7,213,668 | B2 | 5/2007 | Richard et al. | |
| 7,315,779 | B1 | 1/2008 | Rioux et al. | |
| 7,717,222 | B2 | 5/2010 | Spraetz et al. | |
| 8,276,700 | B2* | 10/2012 | Nagao | B62M 27/02 180/190 |
| 8,327,735 | B2 | 12/2012 | Suzuki | |
| 8,491,348 | B2 | 7/2013 | Simard et al. | |
| 2001/0045141 | A1 | 11/2001 | Shirayanagi | |
| 2004/0173397 | A1 | 9/2004 | Haruna et al. | |
| 2006/0042594 | A1* | 3/2006 | Wayama | F02D 9/00 123/399 |
| 2006/0219218 | A1* | 10/2006 | Yuasa | F02D 11/02 123/396 |
| 2007/0056559 | A1* | 3/2007 | Kondo | F02D 9/1065 123/399 |
| 2008/0029055 | A1* | 2/2008 | Hotta | F02D 9/1095 123/184.35 |
| 2008/0185202 | A1* | 8/2008 | Maltais | B62M 27/02 180/190 |
| 2009/0171552 | A1* | 7/2009 | Nakagawa | F02P 5/045 701/103 |
| 2009/0222192 | A1* | 9/2009 | Suzuki | F02D 41/04 701/103 |
| 2010/0030436 | A1* | 2/2010 | Suzuki | B60W 10/02 701/54 |
| 2010/0043589 | A1 | 2/2010 | Chandran et al. | |
| 2010/0163332 | A1* | 7/2010 | Nagao | B62K 23/06 180/335 |
| 2010/0168985 | A1* | 7/2010 | Nagao | B62M 27/02 701/103 |
| 2010/0170473 | A1* | 7/2010 | Itagaki | F02D 9/1065 123/337 |
| 2010/0212630 | A1* | 8/2010 | Nozoe | B60K 31/04 123/399 |
| 2010/0282210 | A1* | 11/2010 | Itagaki | F02D 31/002 123/399 |
| 2010/0327132 | A1* | 12/2010 | Maguire | B62J 11/00 248/201 |
| 2011/0035039 | A1* | 2/2011 | Simard | B60K 26/02 700/101 |
| 2011/0094814 | A1 | 4/2011 | Nagao et al. | |
| 2011/0094817 | A1 | 4/2011 | Nagao et al. | |
| 2011/0162478 | A1 | 7/2011 | Suzuki | |
| 2011/0297462 | A1 | 12/2011 | Grajkowski et al. | |
| 2011/0297463 | A1 | 12/2011 | Grajkowski et al. | |
| 2011/0301824 | A1 | 12/2011 | Nelson et al. | |
| 2011/0301825 | A1* | 12/2011 | Grajkowski | B60K 26/04 701/102 |
| 2011/0303041 | A1 | 12/2011 | Cheng et al. | |
| 2013/0090795 | A1* | 4/2013 | Luke | B60L 11/005 701/22 |
| 2014/0318499 | A1* | 10/2014 | Tanaka | F02D 41/30 123/478 |

FOREIGN PATENT DOCUMENTS

| | | |
|---|---|---|
| CN | 1613710 A | 5/2005 |
| CN | 101239648 A | 8/2008 |
| CN | 101784429 A | 7/2010 |
| RU | 2307759 C1 | 10/2007 |
| RU | 2008149017 A | 6/2010 |
| RU | 2451797 C2 | 5/2012 |
| RU | 2466280 C2 | 11/2012 |
| WO | 2009002572 A1 | 12/2008 |

OTHER PUBLICATIONS

English abstract of CN1496908A, retrieved from https://worldwide.espacenet.com/ on Sep. 2, 2016.
English abstract of CN101784429A, retrieved from https://worldwide.espacenet.com/ on Sep. 2, 2016.
English abstract of CN1613710A, retrieved from https://worldwide.espacenet.com/ on Sep. 2, 2016.
English abstract of CN101239648A, retrieved from https://worldwide.espacenet.com/ on Sep. 2, 2016.
International Search Report of PCT/US2013/048803; dated Jan. 17, 2014; Lee W. Young.
English translation of RU2307759C1; prepared by http://translationportal.epo.org/ on Aug. 6, 2019.
English translation of RU2466280C2; prepared by http://translationportal.epo.org/ on Aug. 6, 2019.
English translation of RU2008149017A; retrieved from https://worldwide.espacenet.com/on Aug. 6, 2019.
Russian Office Action dated Jun. 26, 2019 with its English translation and Search Report in connection with corresponding Russian application No. 2015148577.

* cited by examiner

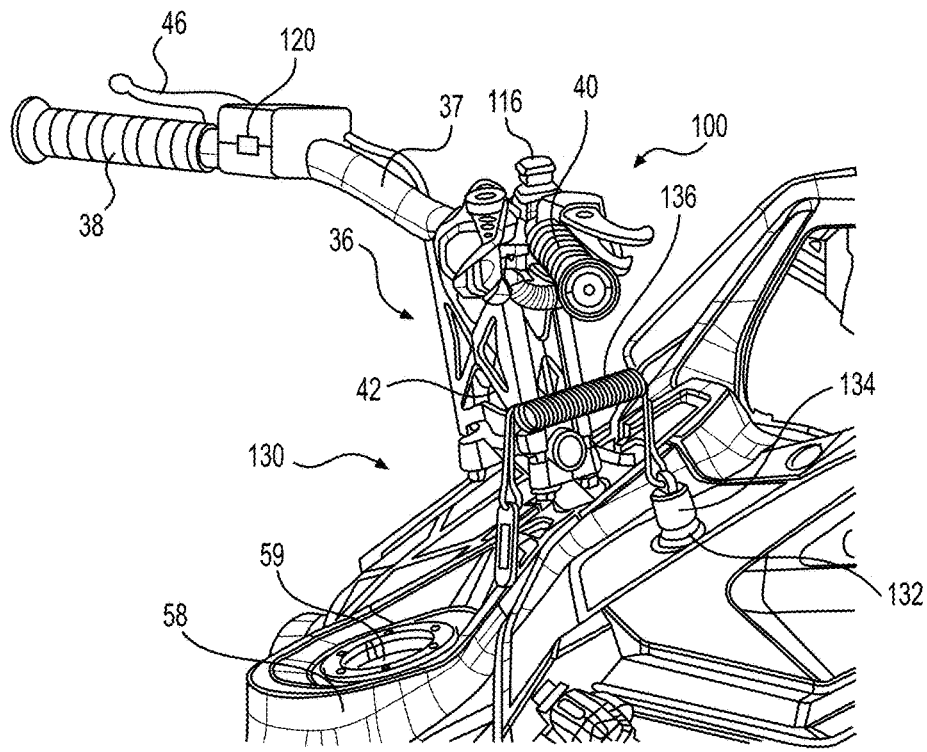
FIG. 3A
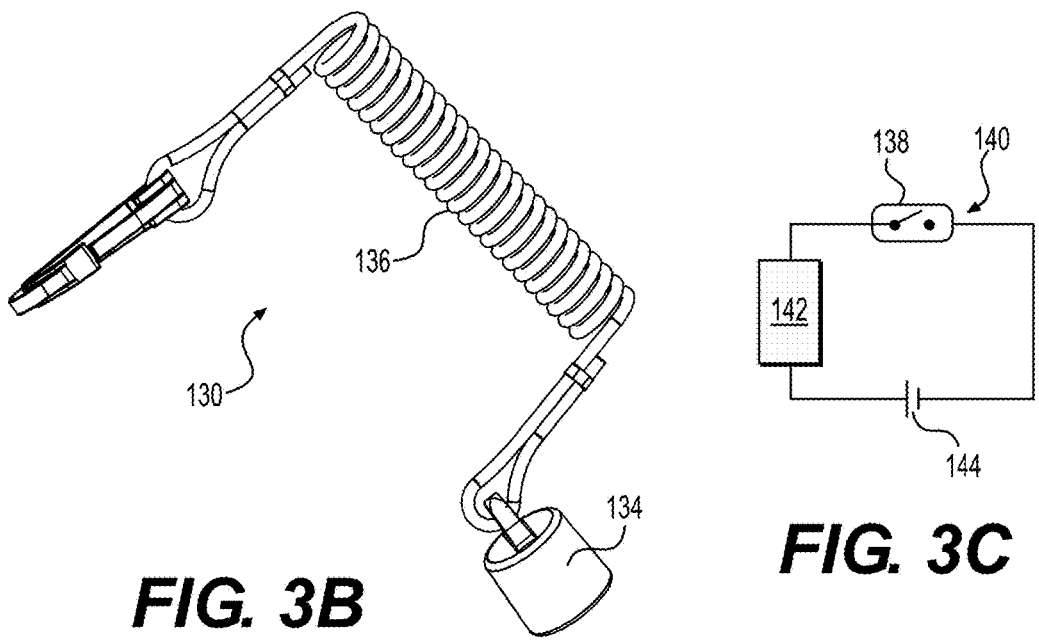
FIG. 3B
FIG. 3C

VEHICLE OPERATION SYSTEM AND METHOD

CROSS-REFERENCE

The present application is divisional of U.S. patent application Ser. No. 14/584,403 filed on Dec. 29, 2014 which is a continuation-in-part of International Patent Application No. PCT/US2013/48803, filed Jun. 29, 2013, which claims priority to U.S. Provisional Patent Application No. 61/666,443 filed on Jun. 29, 2012, U.S. Provisional Patent Application No. 61/758,322 filed on Jan. 30, 2013, and U.S. Provisional Patent Application No. 61/768,285 filed on Feb. 22, 2013, the entirety of all of which is incorporated herein by reference.

TECHNICAL FIELD

The present technology relates to systems and methods for operating vehicles.

BACKGROUND

Snowmobiles and other vehicles used for recreational purposes such as all-terrain vehicles (ATVs), personal watercraft and the like have a throttle operator, such as a throttle pedal or a throttle lever for controlling vehicle speed and/or engine power output. The throttle lever is pivotally mounted to the handlebar so that it pivots towards and away from the handlebar in response to the driver's pushing or releasing of the throttle lever to increase or decrease speed of the vehicle. Similarly, the throttle pedal is pivotably mounted to the vehicle frame on a vehicle floor so as to be accessible by the driver's foot, the pedal being pushed towards the floor to increase the vehicle speed or engine output power. In conventional vehicles, the throttle operator is connected by a mechanical linkage to the throttle valve which regulates air flow to the engine in a fuel-injection engine or fuel intake in a carbureted engine. The degree of opening of the throttle valve directly corresponds to the position of the throttle lever. The air flow to the engine determines the power output by the engine, and therefore the performance of the vehicle. In some situations, it is desirable to control the opening of the throttle valve based not only on the position of the throttle operator but on other factors such as the current or desired engine speed (i.e. rotational speed of an output shaft of the engine), fuel economy, noise emission and the like.

SUMMARY

It is an object of the present technology to ameliorate at least some of the inconveniences present in the prior art.

In one aspect, the present provides a snowmobile including a frame. A snowmobile includes a frame with a tunnel, a fuel tank disposed thereon and an engine connected thereto. A throttle body fluidly communicates with the engine. A throttle valve is disposed in the throttle body for regulating fluid flow through the throttle body into the engine, a position of the throttle valve being movable between an open position and a closed position. A throttle operator connected to the frame to control the position of throttle valve is moveable between an idle position and a drive position. A throttle valve actuator operatively connected to the throttle valve and the throttle operator controls a position of the throttle valve based at least in part on the throttle operator position, the throttle valve actuator being disposed longitudinally between the fuel tank and the engine.

In a further aspect, the fuel tank comprises a portion extending forwardly of the tunnel, and the throttle valve actuator is disposed below the forwardly extending portion of the fuel tank.

In another aspect, a seat is disposed at least partly on the tunnel. The seat includes an upper surface disposed higher than the throttle valve actuator.

In another aspect, the seat further comprises a left lateral surface and a right lateral surface, the throttle valve actuator being disposed laterally between the left lateral surface and the right lateral surface.

In a further aspect, an engine compartment extends forwardly from the tunnel. An upper structure includes a rear assembly extending upwardly and forwardly from the tunnel, a front assembly extending forwardly and downwardly from the rear assembly. The upper structure forms a pyramidal structure. The throttle valve actuator is disposed within the pyramidal structure.

In yet another aspect, a front assembly includes a front left brace extending upwardly, rearwardly and rightwardly from a suspension module, and a front right brace extending upwardly, rearwardly and leftwardly from a suspension module. The rear assembly includes a rear left brace extending upwardly, forwardly and rightwardly from the tunnel, and a rear right brace extending upwardly, forwardly and leftwardly from the tunnel. The front left brace and the front right brace define a front face of the pyramid structure. The rear left brace and rear right brace define a rear face of the pyramid structure. The front left brace and rear left brace define a left face of the pyramid structure. The front right brace and rear right brace define a right face of the pyramid structure. The throttle valve actuator is disposed laterally between the right and left faces of the pyramid structure. The throttle valve actuator is disposed longitudinally between the front and rear faces of the pyramid structure.

In yet another aspect, the front left brace, the front right brace, the rear left brace and the rear right brace are joined together to form an apex of the pyramid structure. The apex is disposed vertically higher than the throttle actuator, and at least one of the front left brace, the front right brace, the rear left brace and the rear right brace extends vertically lower than the throttle actuator.

In a further aspect, the engine includes a cylinder defining a cylinder axis, an exhaust outlet defined in a forward portion of the cylinder, and an air inlet defined in a rearward portion of the cylinder. The throttle body fluidly communicates with the air inlet.

In an additional aspect, a primary air box fluidly connects the throttle body to the air inlet. A secondary air box fluidly communicates with the throttle body and receives air from outside the engine. At least a portion of the secondary air box is disposed above the engine. At least a portion of the secondary air box is disposed forwardly of the engine.

In a further aspect, a continuously variable transmission has a drive pulley connected to the engine and rotatable about a drive pulley rotation axis. The driven pulley rotates about a driven pulley rotation axis. An endless belt couples the driven pulley to the drive pulley. The throttle valve actuator is disposed rearward of a CVT plane containing the drive pulley rotation axis and the driven pulley rotation axis.

In a further aspect, at least a portion of the throttle valve actuator is disposed longitudinally within a projection of a circumferential edge of the driven pulley on a longitudinally extending vertical plane.

In another aspect, at least a portion of the throttle valve actuator is disposed vertically within a projection of the circumferential edge of the driven pulley on a longitudinally extending vertical plane.

In another aspect, a countershaft is connected between the driven pulley and a gear reduction drive. The throttle valve actuator is disposed longitudinally rearward of the countershaft.

In another aspect, a sprocket engages the track and defines a sprocket axis. The throttle valve actuator is disposed longitudinally forward of the sprocket axis.

For purposes of the present application, terms related to spatial orientation when referring to a vehicle and components in relation to the vehicle, such as "forwardly", "rearwardly", "left", "right", "above" and "below", are as they would be understood by a driver of the vehicle, with the vehicle in a straight ahead orientation (i.e. not steered left or right), and in an upright position (i.e. not tilted). The definitions provided herein take precedence over the definitions that may be provided in the documents incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3A is a perspective view, taken from a rear, right side, of a portion of the snowmobile of FIG. 1 showing a security system;

FIG. 3B is a left side elevation view of a key of the security system of FIG. 3A;

Figure 1:
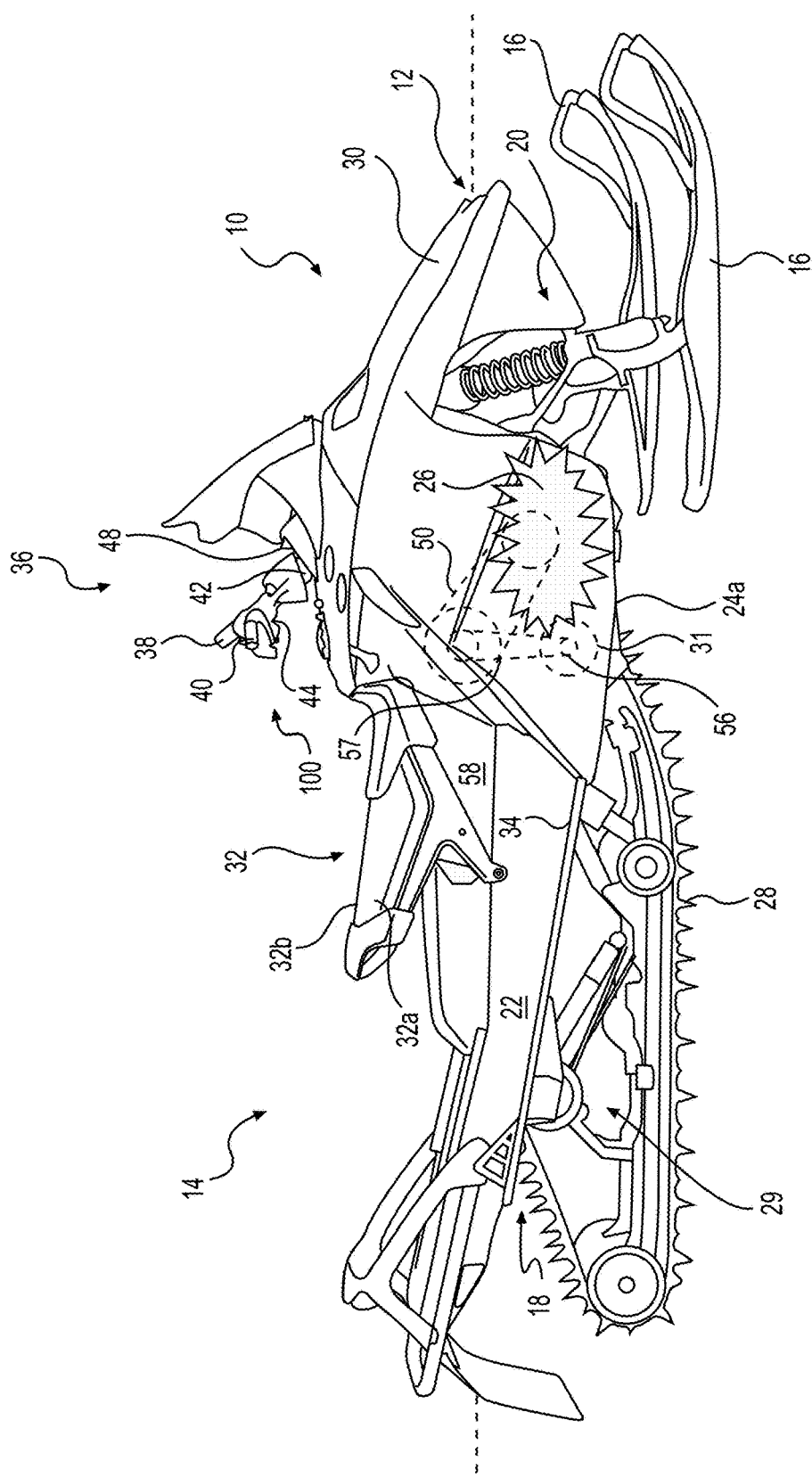
FIG. 1 is a right side elevation view of a snowmobile.
Figure 5A:
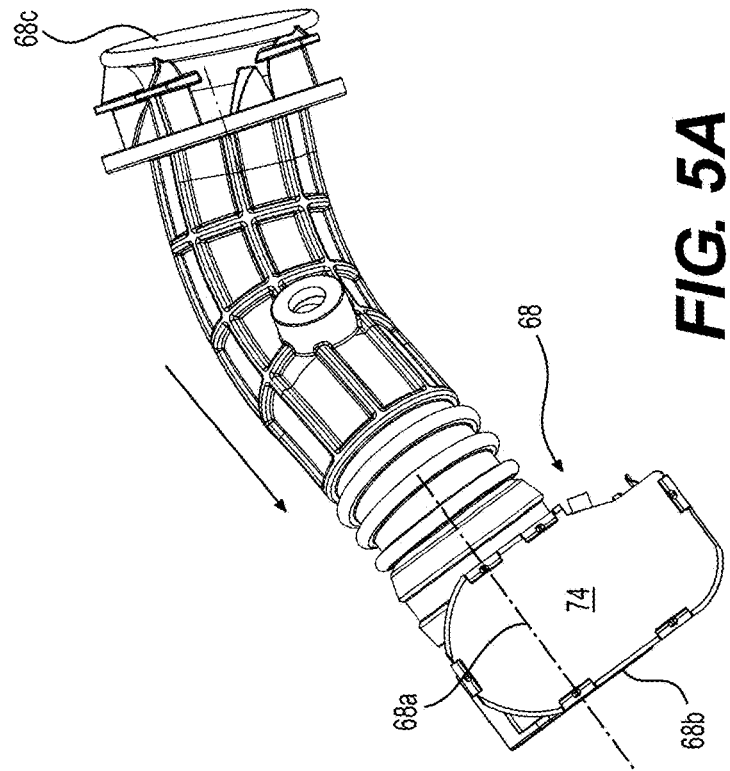
Figure 4:
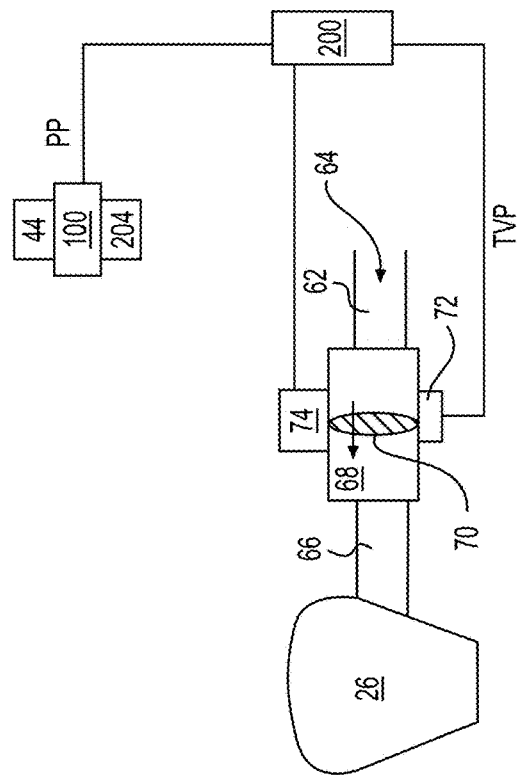
Figure 5B:
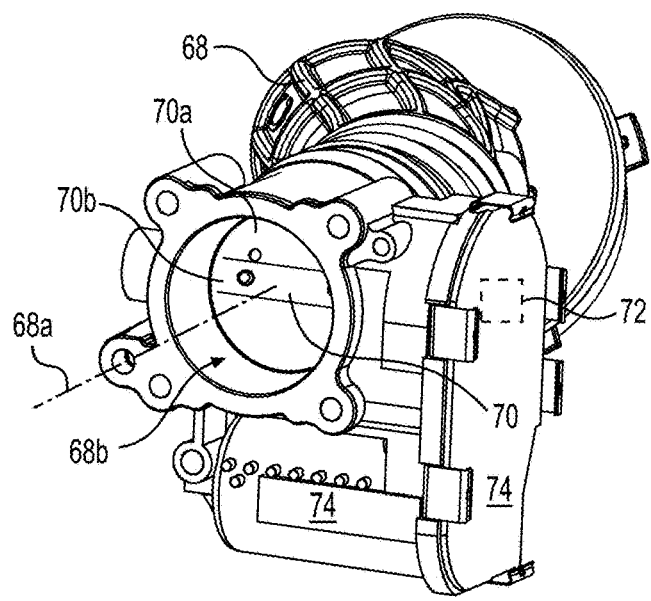
Figure 5C:
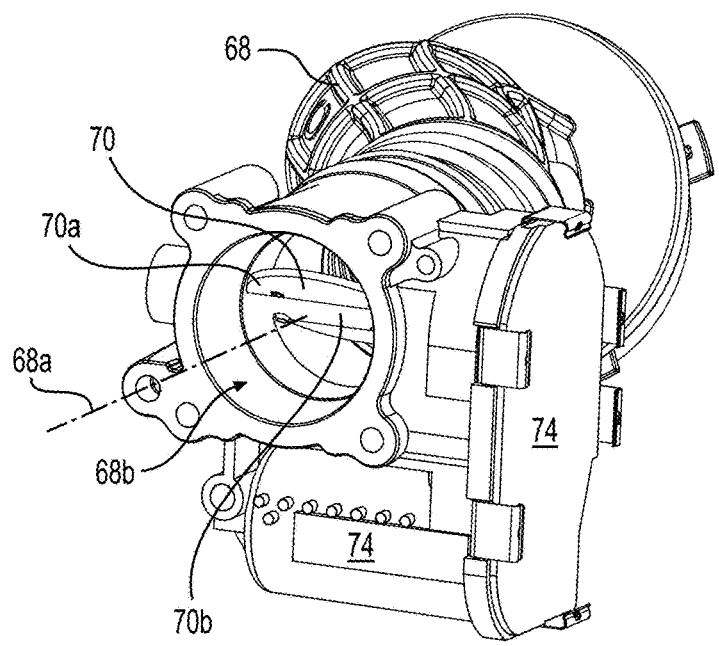
Figure 6:
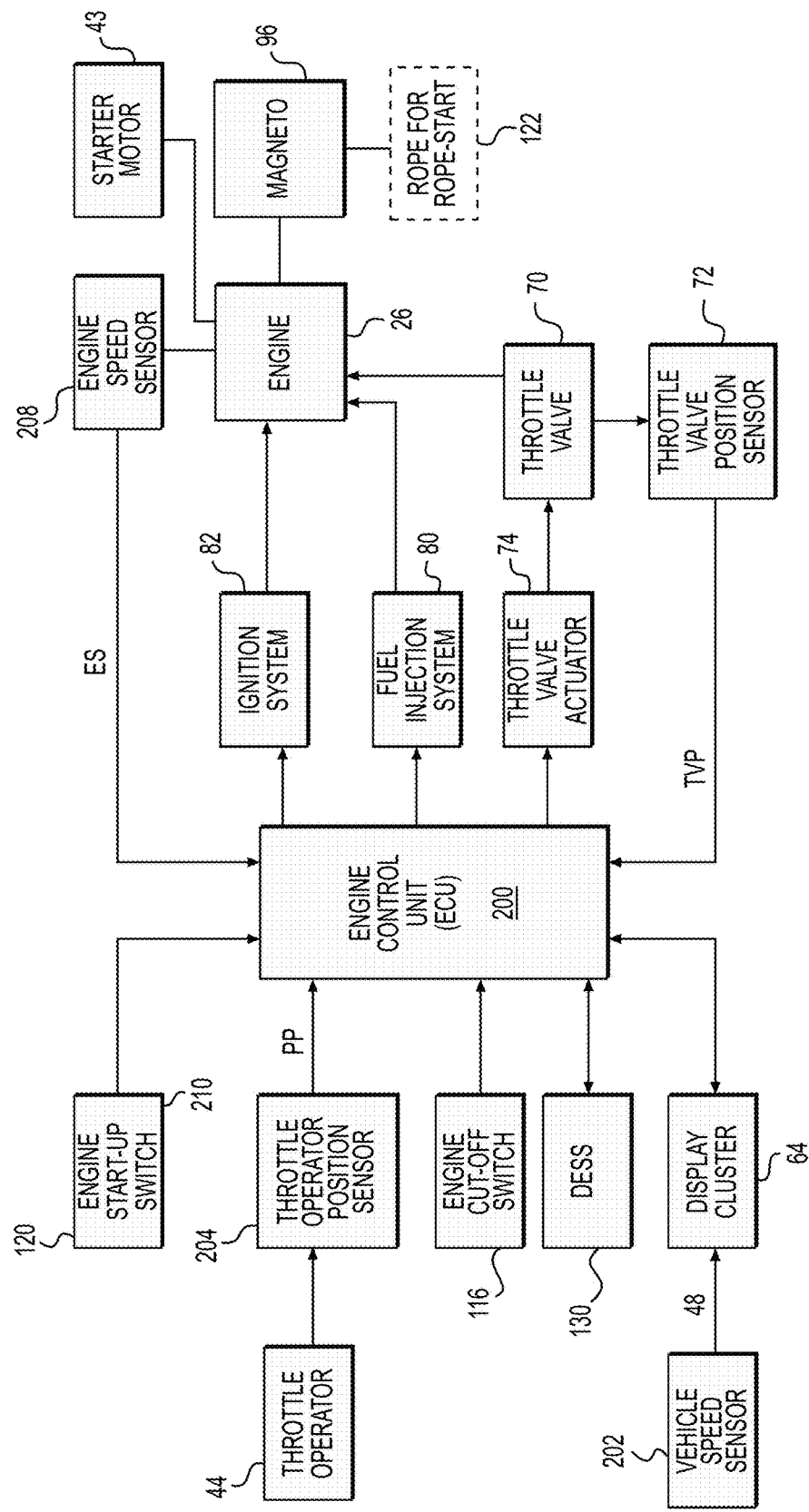
Figure 7:
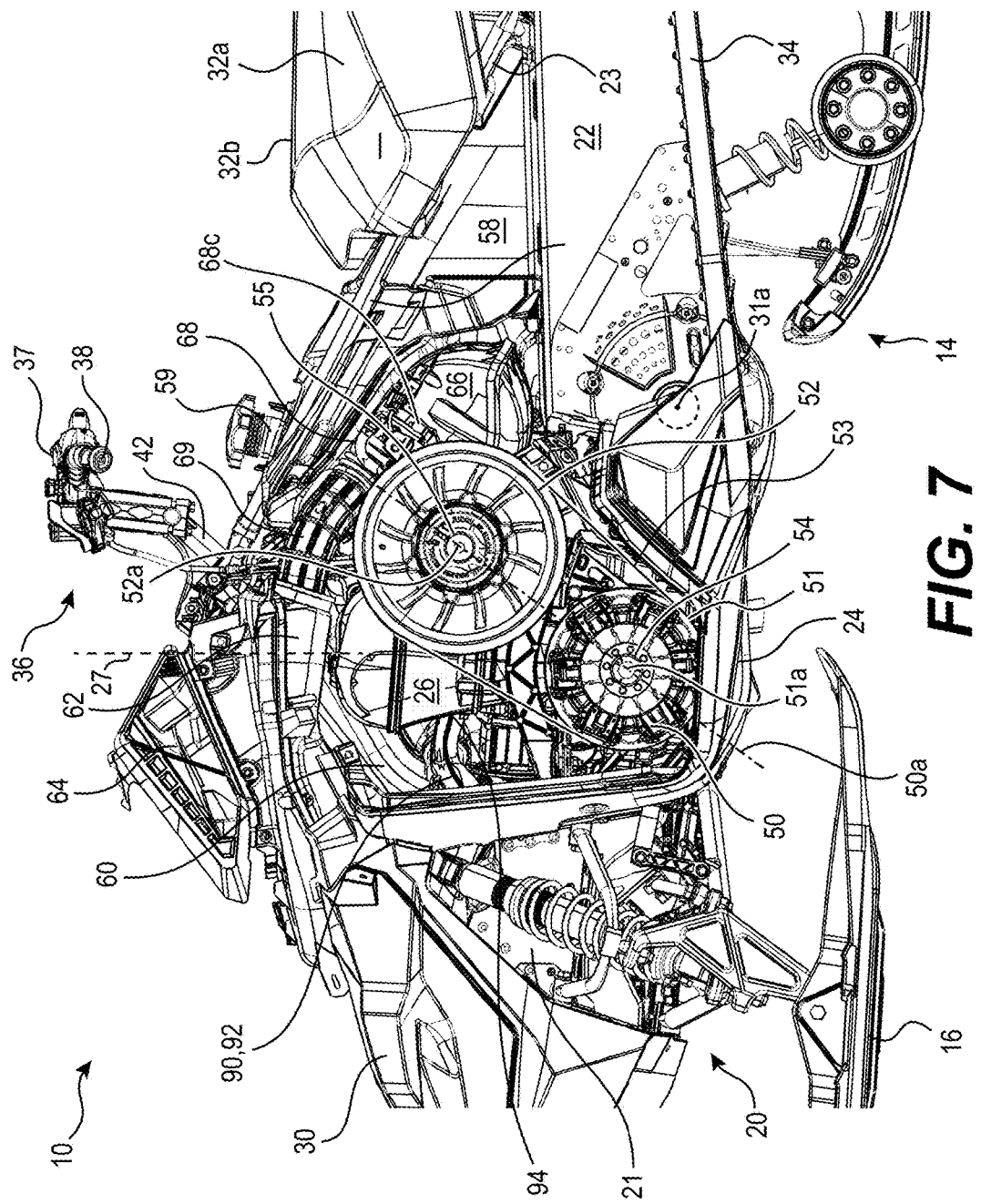
Figure 8:
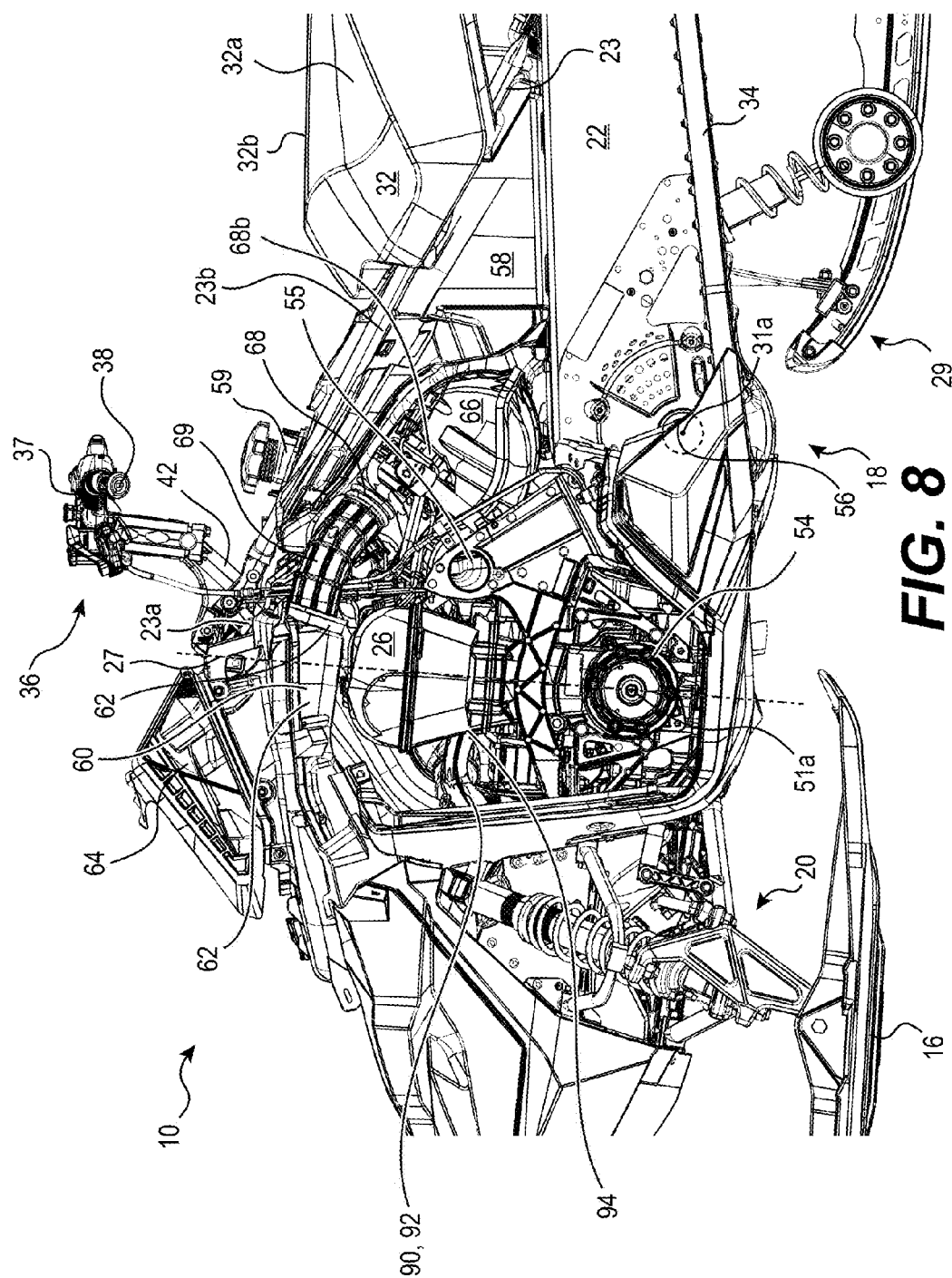
Figure 9:
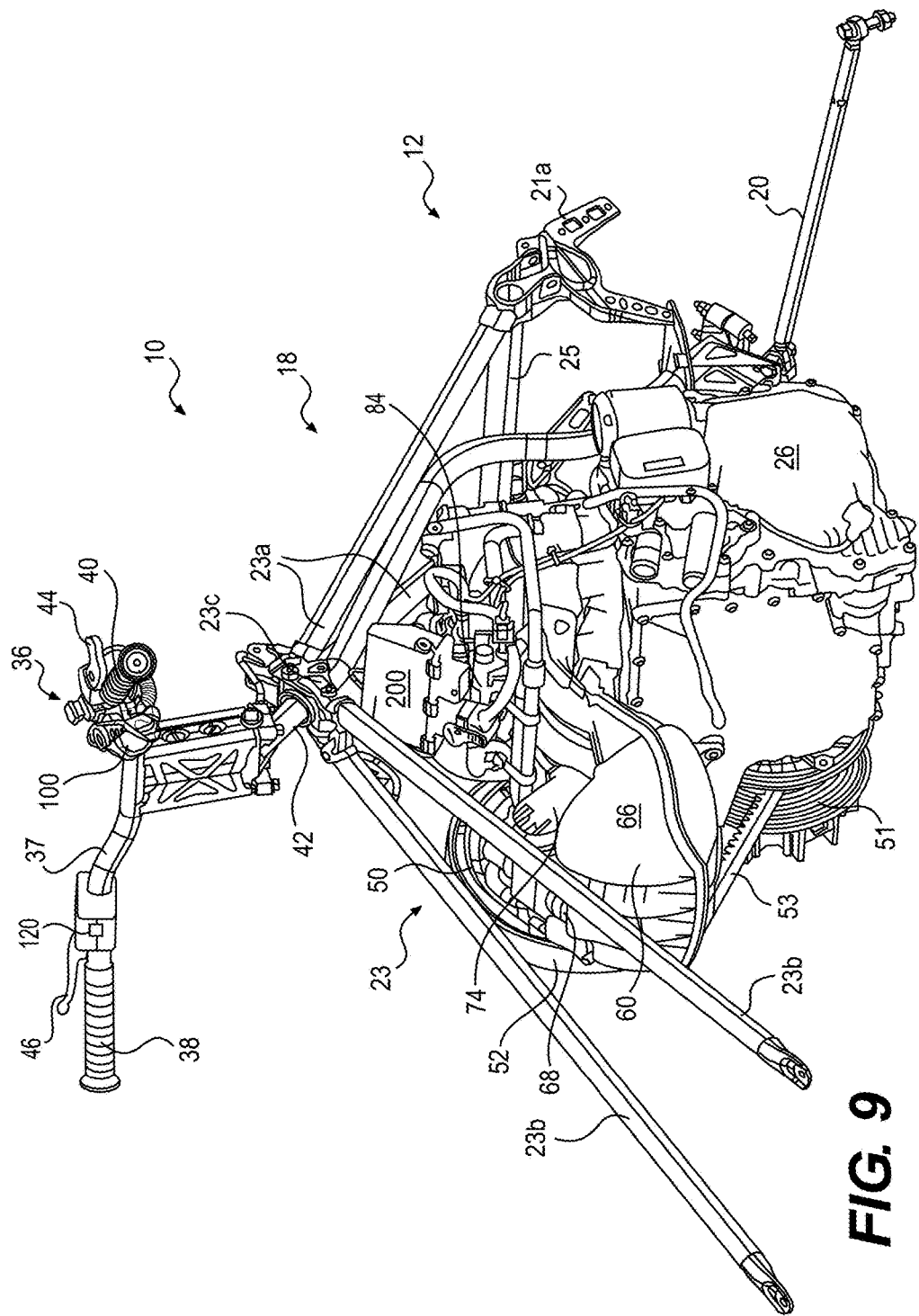
Figure 10:
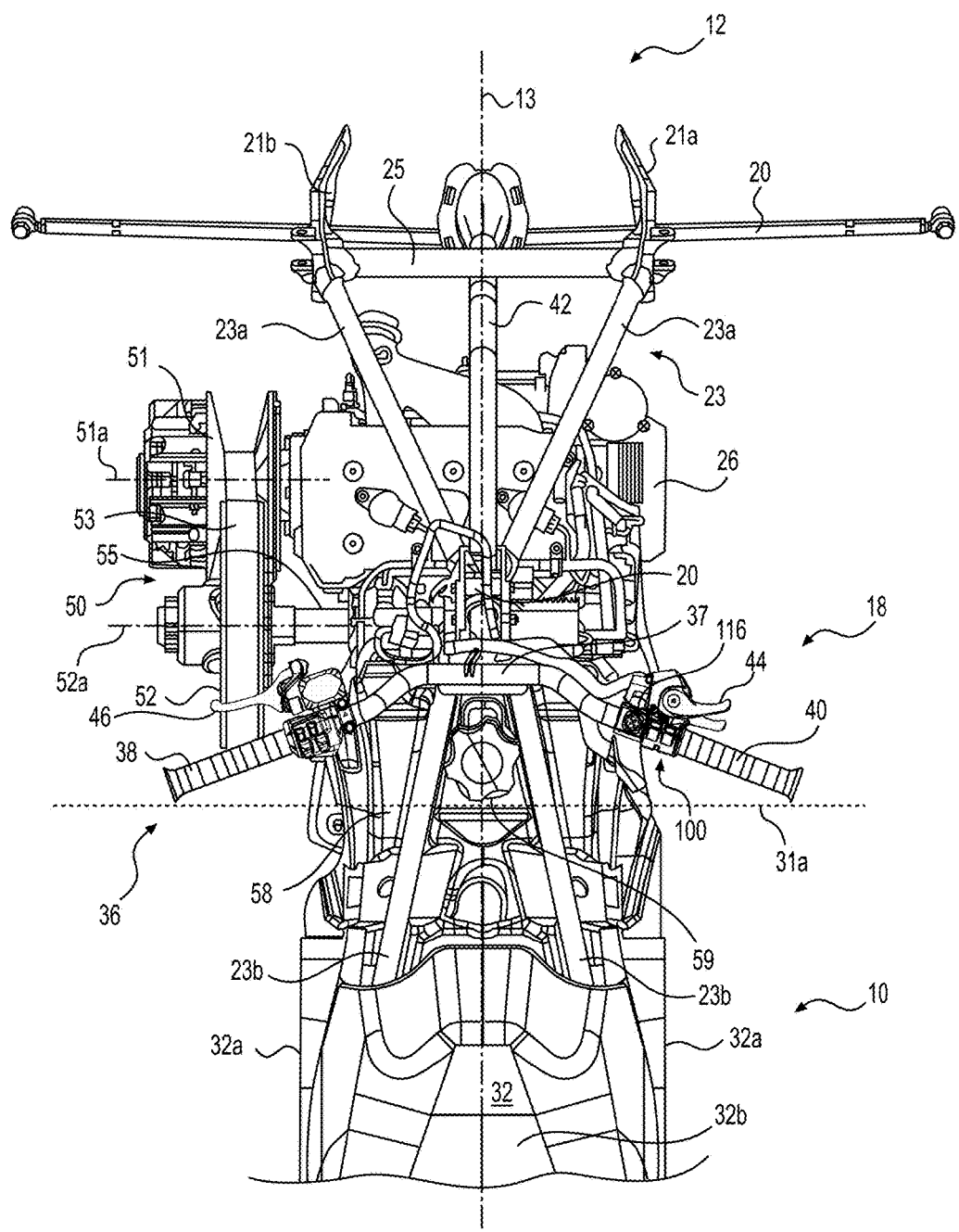
Figure 11:
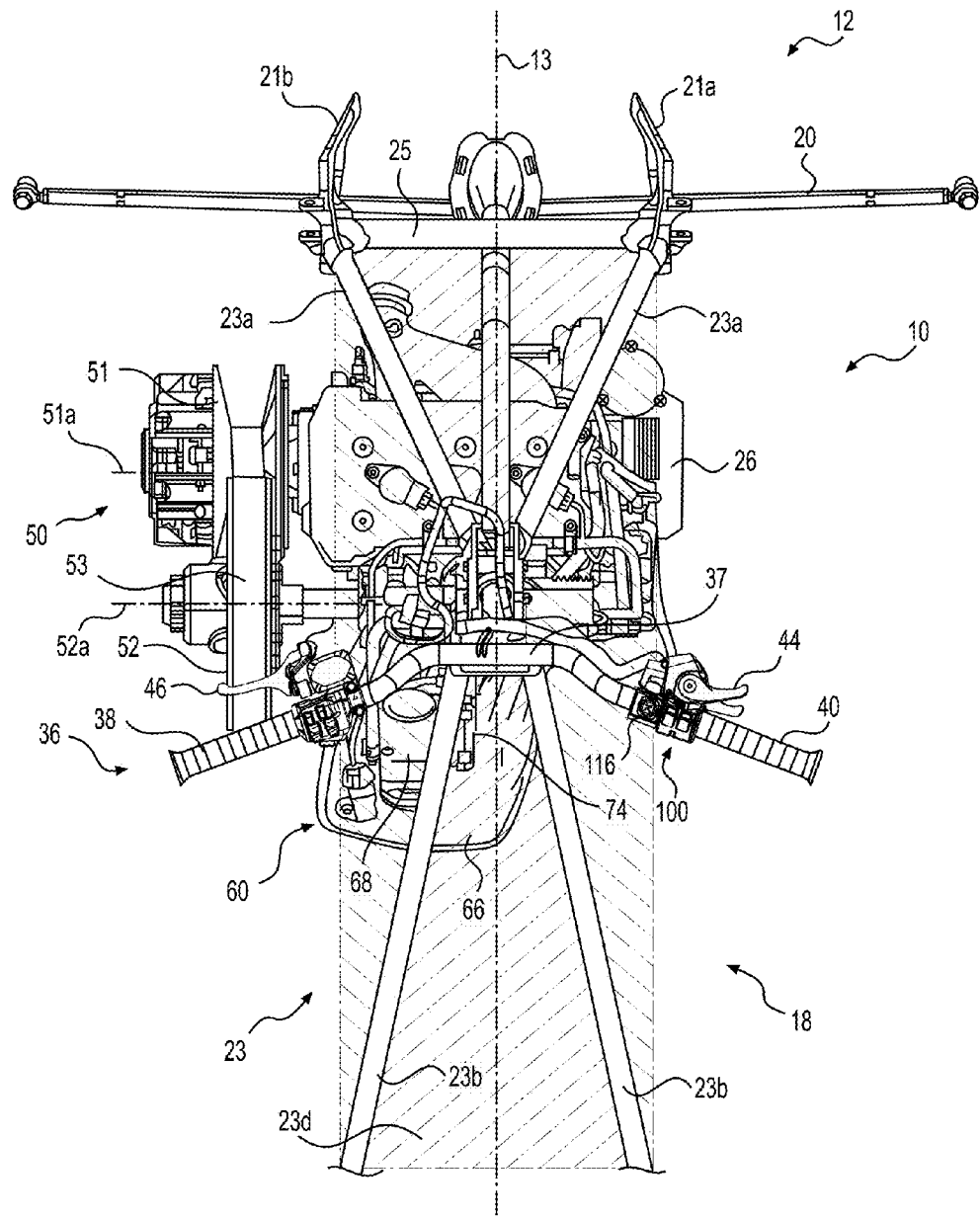
Figure 12:
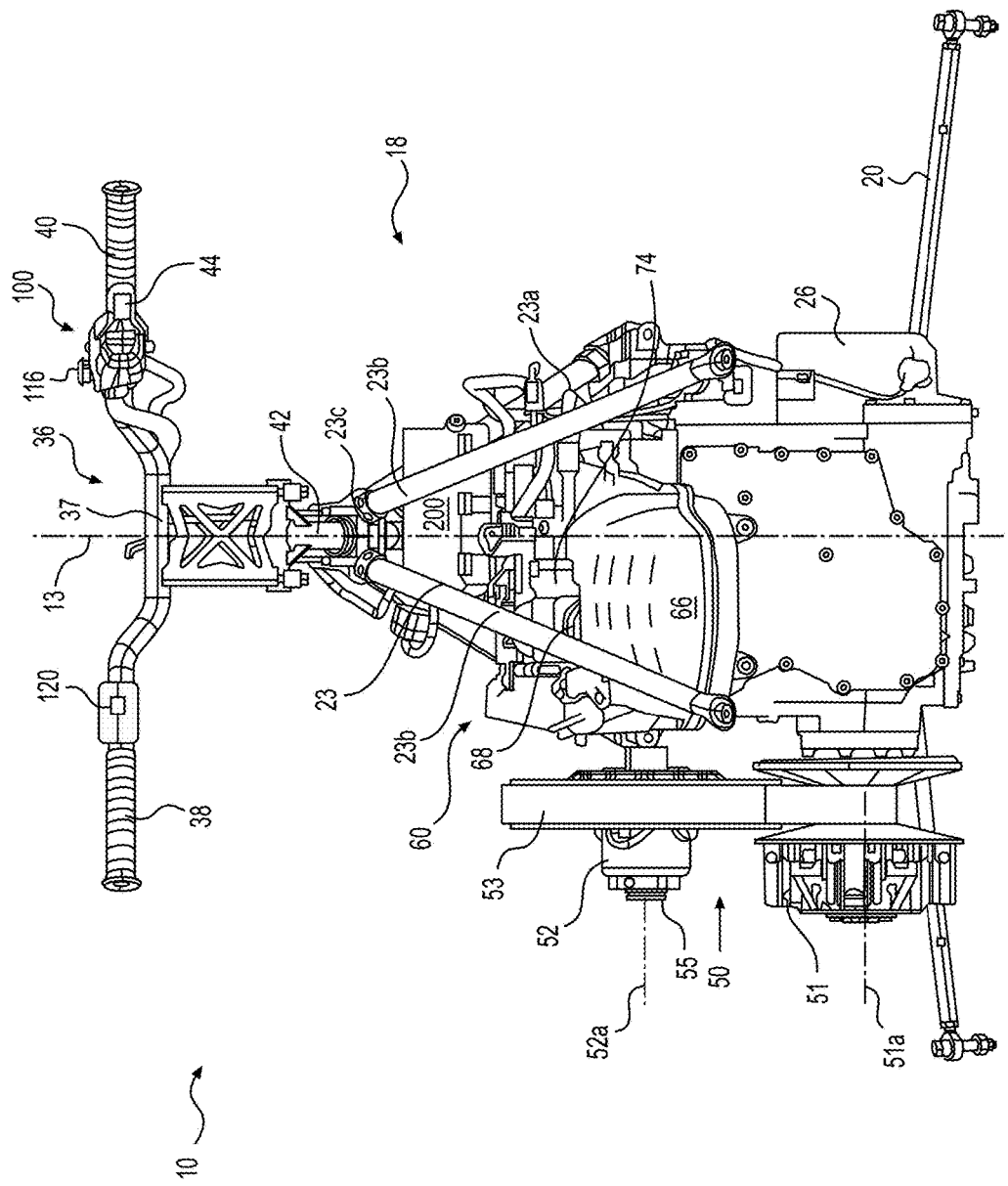
Figure 13:
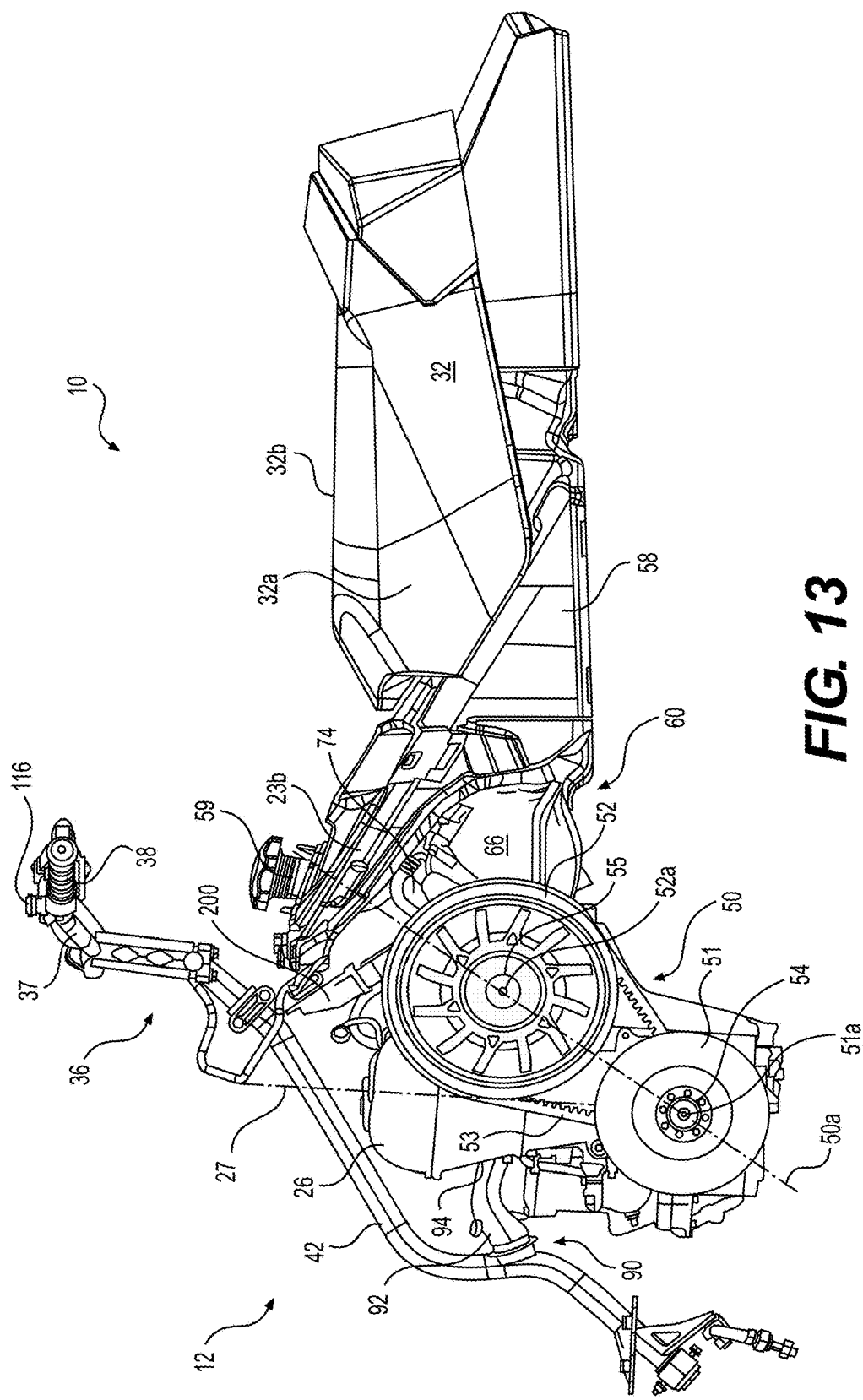
Figure 14:
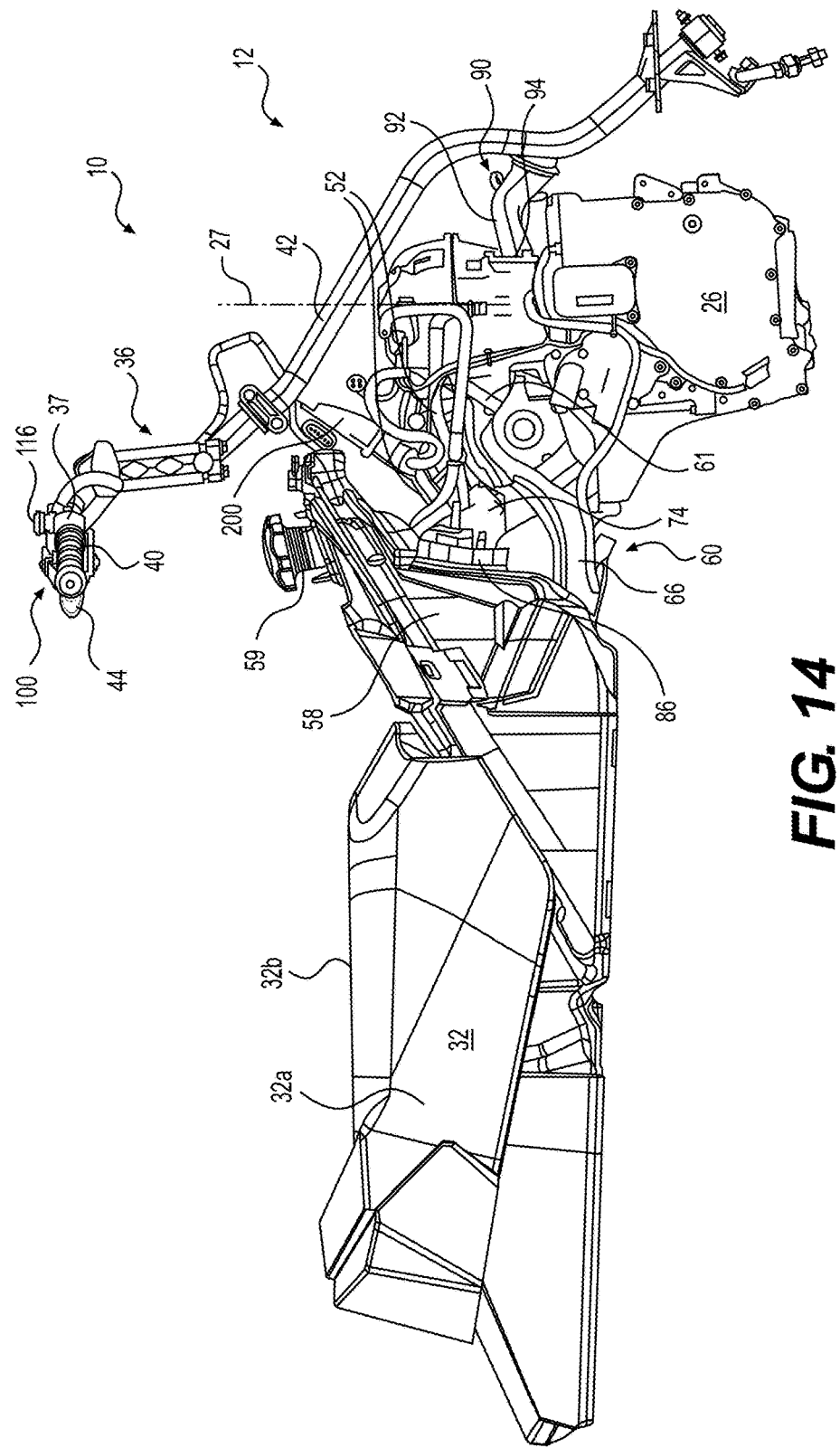
Figure 15:
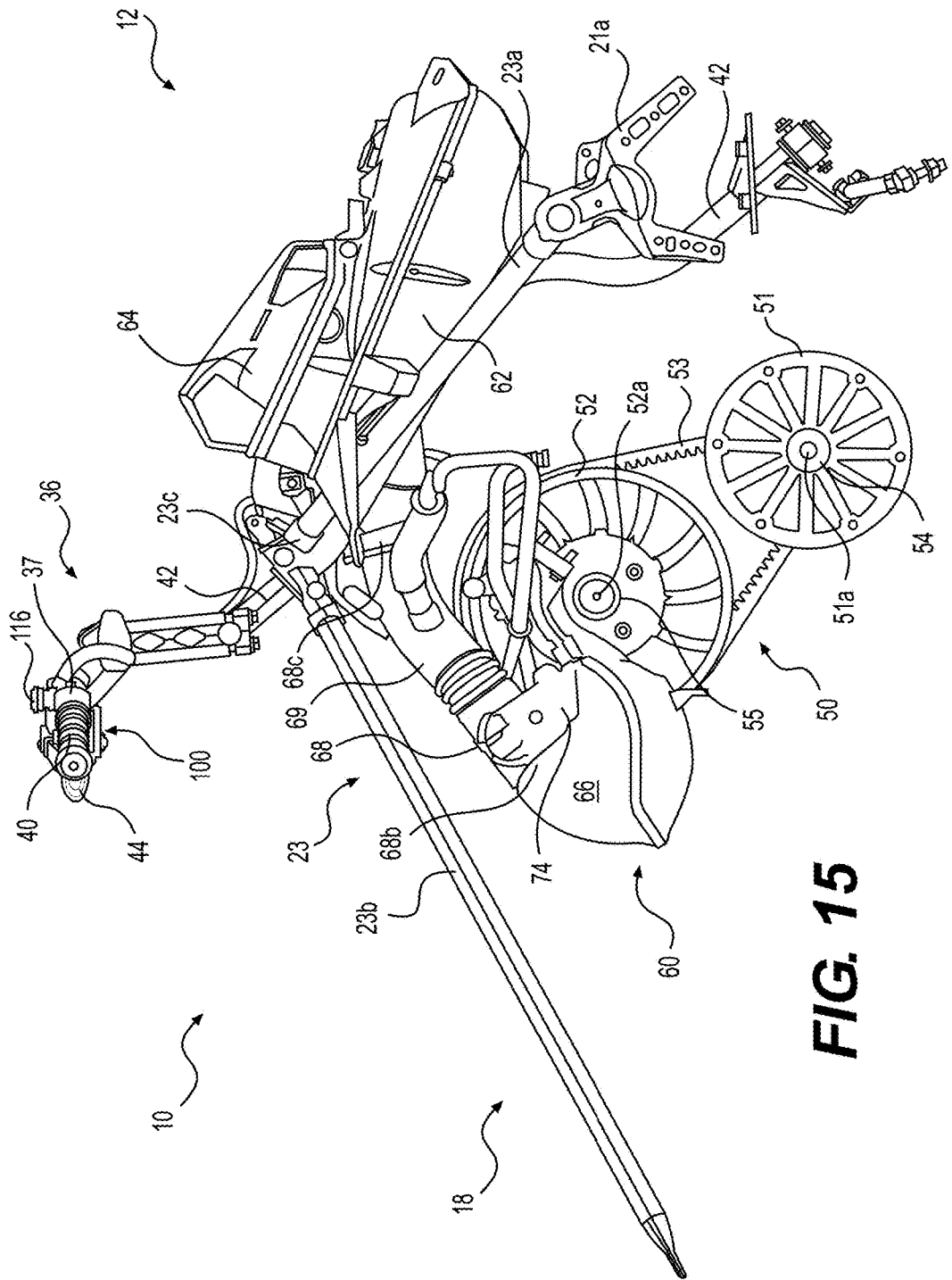
Figure 16A:
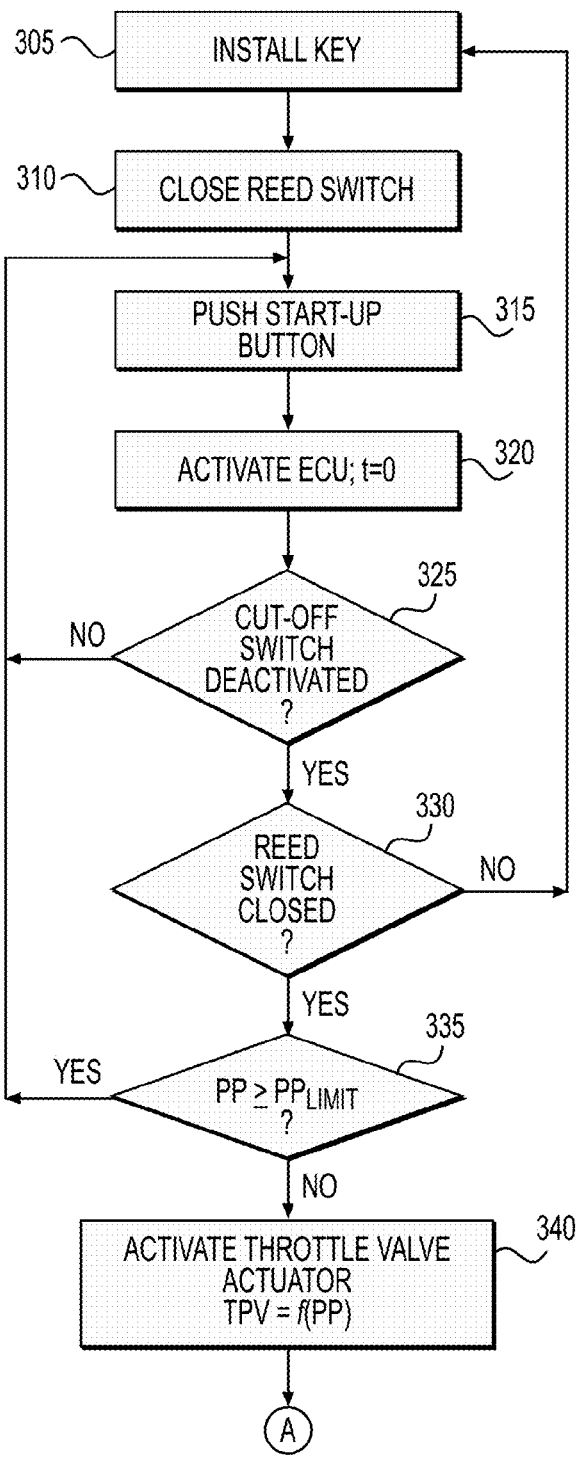
Figure 16B:
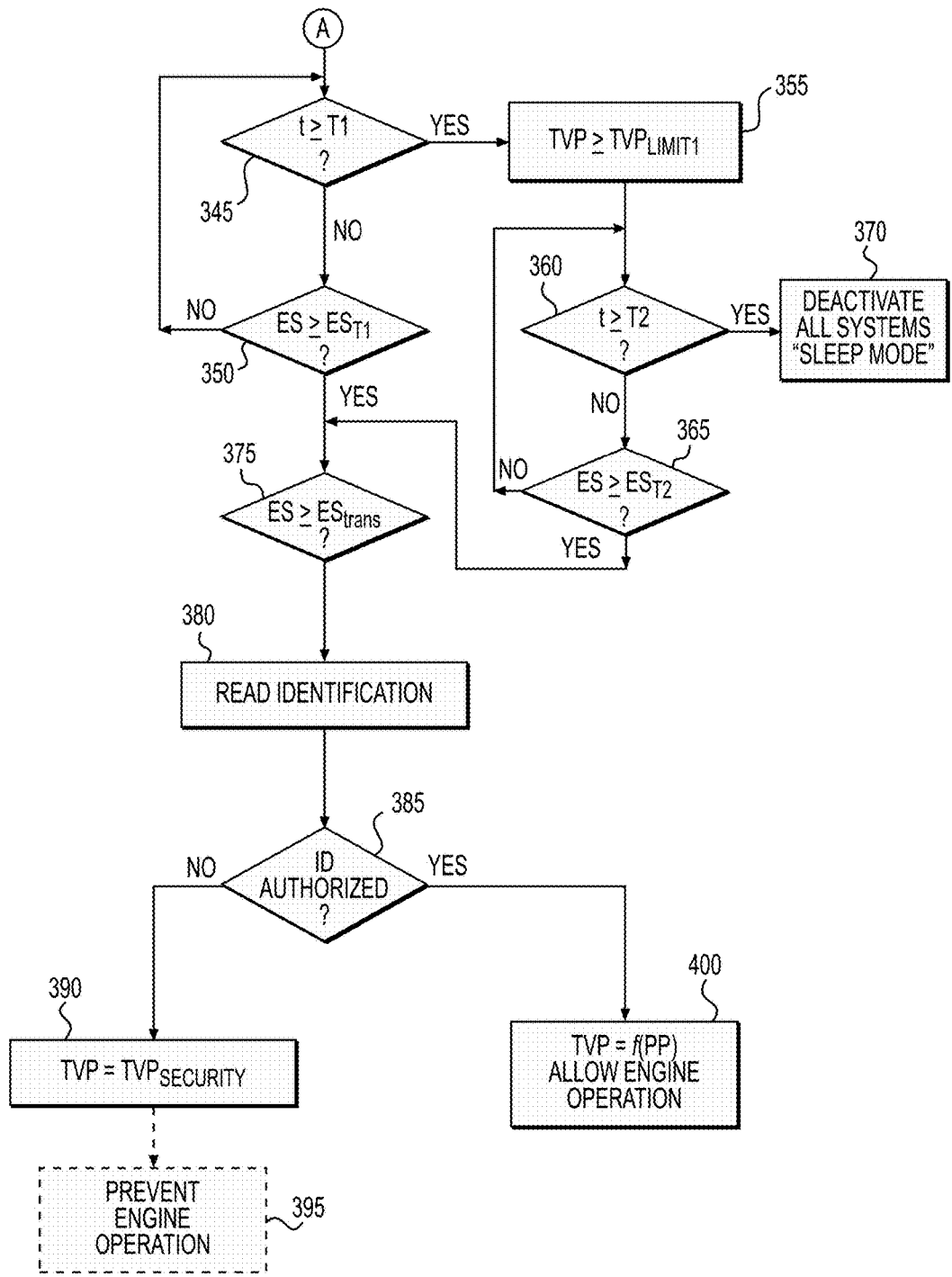
Figure 17:
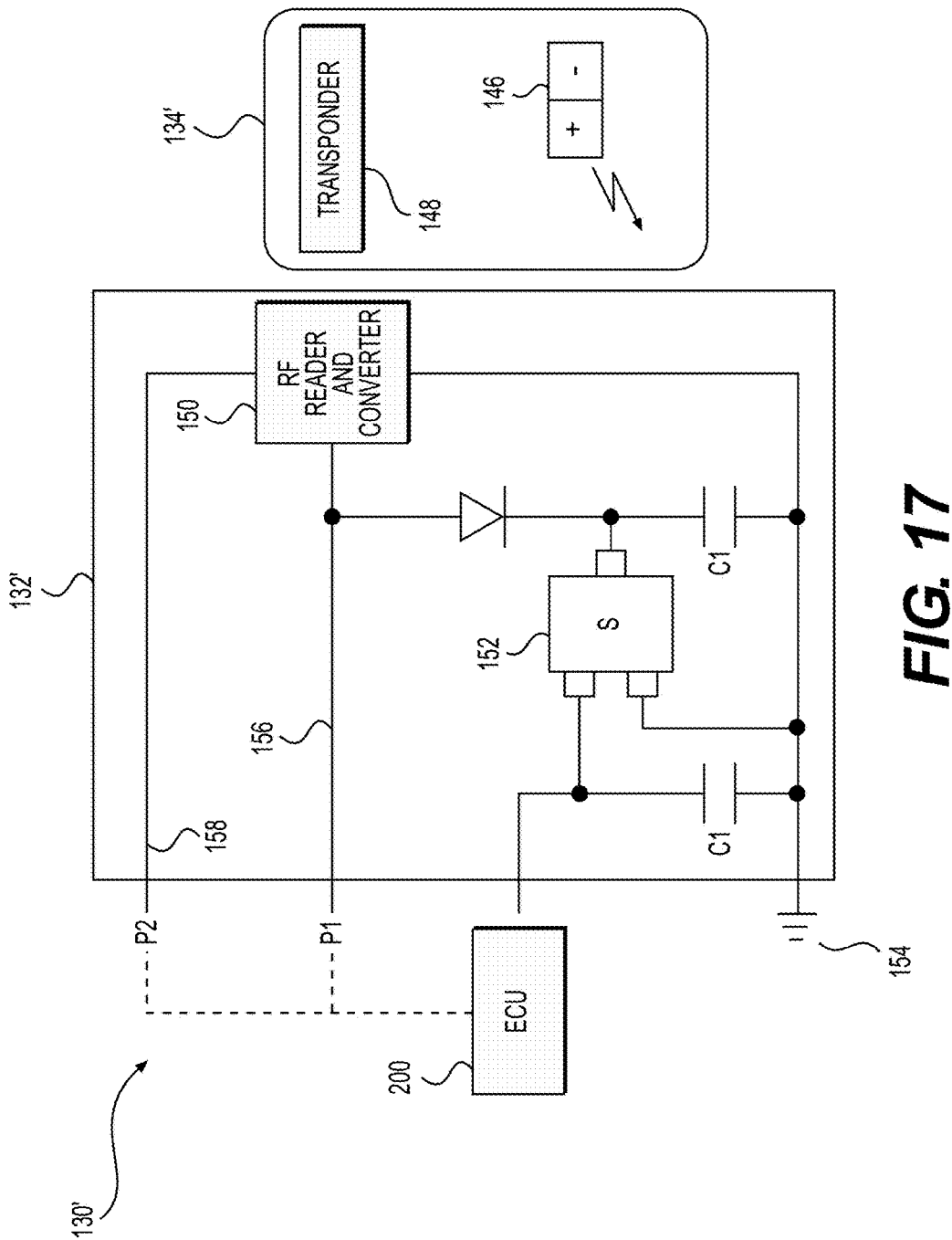
Figure 18:
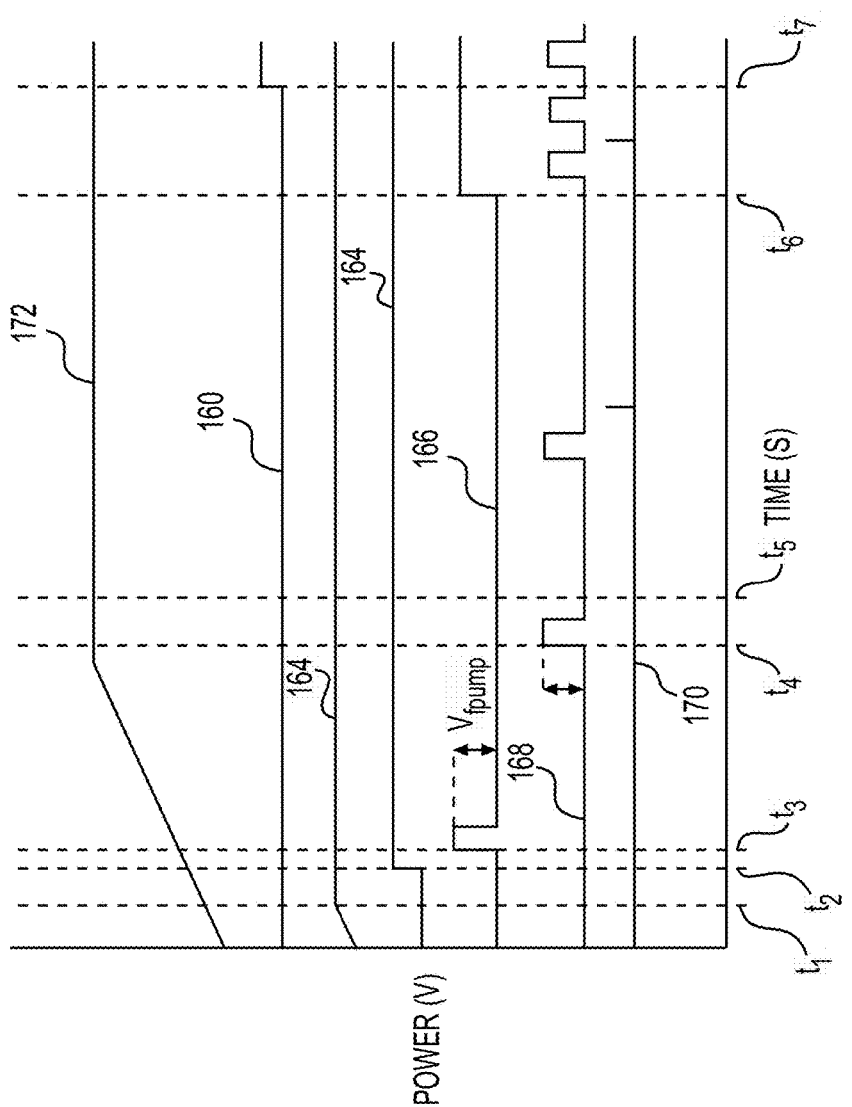
Figure 19:
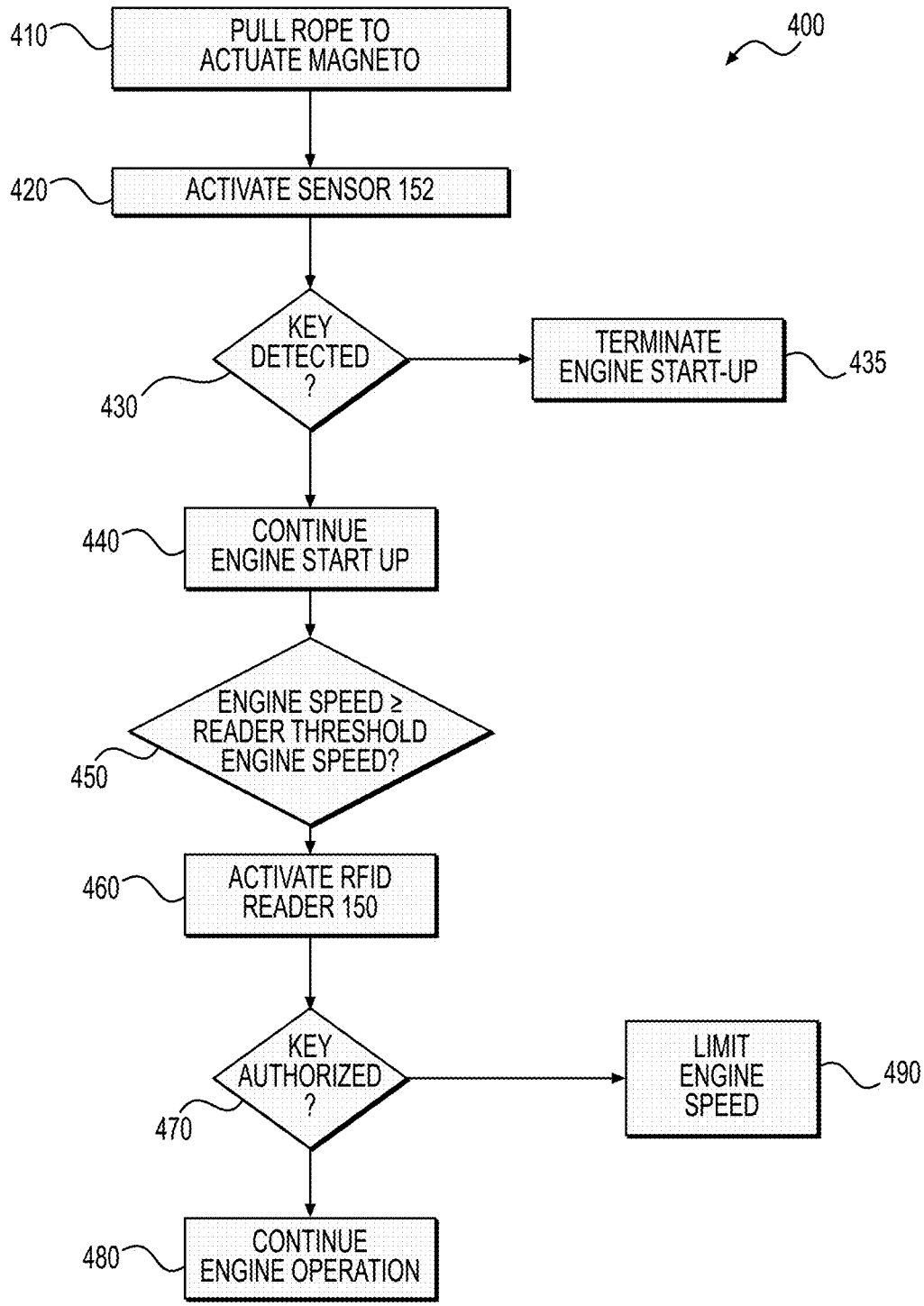

3C is a schematic illustration of a circuit of the security system of FIG. 3A;

FIG. 4 is a schematic illustration of an air intake system connected to an engine control unit and a throttle control module of the snowmobile of FIG. 1;

FIG. 5A is a side elevation view of a throttle body and a throttle valve actuator of the air intake system;

FIG. 5B is a perspective view of the throttle body and throttle valve actuator of FIG. 5A with a throttle valve disposed in a closed position;

FIG. 5C is a perspective view of the throttle body and throttle valve actuator of FIG. 5A with a throttle valve disposed in an open position;

FIG. 6 is a schematic illustration of elements of the engine control unit of the snowmobile of FIG. 1;

FIG. 7 is a left side elevation view of a portion of the snowmobile of FIG. 1 showing a portion of the frame, the engine, the CVT, and other components connected thereto;

FIG. 8 is a left side elevation view of a portion of the snowmobile of FIG. 1 with the CVT removed for clarity;

FIG. 9 is a perspective view of a portion of the snowmobile of FIG. 1;

FIG. 10 is a top plan view of a portion of the snowmobile of FIG. 1;

FIG. 11 is a top plan view of the snowmobile portion of the FIG. 10 with the seat and fuel tank removed for clarity;

FIG. 12 is a rear elevation view of the snowmobile portion of the FIG. 11;

FIG. 13 is a left side elevation view of the snowmobile portion of the FIG. 10;

FIG. 14 is a right side elevation view of the snowmobile portion of the FIG. 10;

FIG. 15 is a right side elevation view of the snowmobile portion of the FIG. 14 with the seat and fuel tank removed for clarity;

FIG. 16A is a logic diagram illustrating a method of controlling operation of the snowmobile of FIG. 1; and FIG. 16B is a continuation of the logic diagram of FIG. 16A;

FIG. 17 is a schematic illustration of another implementation of a security system;

FIG. 18 is a graphical representation of various electrical signals as a function of time during start-up of the vehicle using the security system of FIG. 17; and FIG. 19 is a logic diagram illustrating another implementation of a method of controlling operation of the snowmobile.

DETAILED DESCRIPTION

Although a snowmobile is being described herein, it should be understood that aspects of the present technology could also be applied to other kinds of vehicles such as, for example, all-terrain vehicles (ATV), motorcycles, three-wheeled motorized vehicles, and personal watercraft.

Referring to FIG. 1, a snowmobile 10 includes a forward end 12 and a rearward end 14 which are defined consistently with a travel direction of the vehicle. The snowmobile 10 includes a vehicle body in the form of a frame or chassis 18 which includes a tunnel 22, an engine support structure 24, a front suspension module 21, and an upper structure 23 (FIG. 7). A longitudinal centerplane 13 (longitudinally disposed vertical plane) is defined by the frame 18 (FIG. 10).

Two skis 16 positioned at the forward end 12 of the snowmobile 10 are attached to the frame 18 by a front suspension assembly 20. The front suspension assembly 20 includes ski legs, supporting arms and ball joints (not shown) for operatively joining the respective ski legs, supporting arms and a steering column 42. The front suspension assembly 20 and skis 16 are connected by a front suspension module 21 to the front end of the engine compartment 24 as can be seen in FIG. 7.

An the engine support structure 24. An engine 26 (illustrated schematically in FIG. 1), is carried in an engine compartment defined by the engine support structure 24 of the frame 18. An engine control unit (ECU) 200 is operatively connected to the engine 26 for controlling operation of the engine 26 as will be discussed below in further detail. A battery 144 (FIG. 3C) is also provided to power vehicle systems such as the ECU 200, a starter motor 43, the throttle valve actuator 74 (FIG. 5A), and the like, before the engine 26 is operating at an engine speed that is great enough to generate enough power for these functions.

An endless drive track 28 is positioned at the rear end 14 of the snowmobile 10. The drive track 28 is disposed generally under the tunnel 22, and operatively connected to the engine 26 via a belt transmission system 50 (illustrated schematically by broken lines in FIG. 1). The endless drive track 28 is driven to run about a rear suspension assembly 29 for propulsion of the snowmobile 10. The rear suspension assembly 29 includes a drive sprocket 31, one or more idler wheels and a pair of slide rails in sliding contact with the endless drive track 28. The drive sprocket defines a sprocket axis 31a (FIG. 7). The slide rails are attached to the tunnel 22 by front and rear suspension arms and one or more shock absorbers which may further include a coil spring (not shown) surrounding the individual shock absorbers.

At the front end 12 of the snowmobile 10, fairings 30 enclose the engine 26 and the belt transmission system 50, thereby providing an external shell that not only protects the engine 26 and the belt transmission system 50, but can also be decorated to make the snowmobile 10 more aesthetically pleasing. Typically, the fairings 30 include a hood (not indicated) and one or more side panels which can be opened to allow access to the engine 26 and the belt transmission system 50 when this is required, for example, for inspection or maintenance of the engine 26 and/or the belt transmission system 50. A windshield connected to the fairings 30 acts as a wind screen to lessen the force of the air on the rider while the snowmobile 10 is moving.

A fuel tank 58, supported above the tunnel 22, supplies fuel to the engine 26 for its operation. Fuel is collected in the fuel tank 58 via a filler tube 59 (FIG. 7) disposed on an upper surface of the fuel tank 58. The filler tube 59 is formed in a portion of the fuel tank 58 extending upwardly and forwardly from the tunnel 22.

A straddle-type seat 32 is positioned atop the fuel tank 58 to accommodate a driver of the snowmobile 10. The lower surface of the seat 32 is positioned on the fuel tank 58. The front portion of the upper surface of the fuel tank 58 extends forwardly and upwardly from the upper surface 38 of the seat 32. The seat 32 has left and right lateral surfaces 37 extending downwardly from the upper seat surface 38. A rear portion of the seat 32 may include a storage compartment or can be used to accommodate a passenger seat (not indicated). A footrest 34 is positioned on each side of the snowmobile 10 below the seat 32 to accommodate the driver's feet.

A display cluster 48 is provided in front of the seat 32 to display information, such as the vehicle speed, engine speed, vehicle mode, temperature and the like, to the driver of the snowmobile 10. The display cluster 48 possibly includes one or more gauges, display screens, indicator lights and sound output devices such as speakers, alarms and the like.

With reference to FIGS. 9 and 10, the upper structure 23 comprises a left and right forward braces 23a and left and right rearward braces 23b. The braces 23a, 23b interconnect together at a junction 23c above the engine compartment 24 to form a pyramidal structure. The forward braces 23a extend downwardly, forwardly and laterally outwardly from the junction 23c to the corresponding left or right front corner of the front suspension module 21. A lateral support brace 25 connects between the bottom ends of the forward braces 23a. A front suspension module bracket 21a is attached to the bottom end of each forward support brace 23a and to the front suspension module 21 to distribute force from the front suspension 20 to other areas of the snowmobile 10. Each rearward brace 23b extends downwardly, rearwardly and laterally outwardly from the junction 23c to the tunnel 22.

With reference to FIG. 11, the right braces 23a and 23b form a first imaginary face of the pyramidal structure 23d. The rear braces 23b form a second imaginary face of the pyramidal structure 23d. The left braces 23a and 23b form a third imaginary face of the pyramidal structure 23d. The front braces 23a form a fourth imaginary wall of the pyramidal structure 23d. The four imaginary faces forming the pyramidal structure 23d overlay several components within the engine compartment 24 including the throttle body 68, throttle valve 70, throttle valve actuator 74 and throttle valve sensor 72.

A steering assembly 36, including a handlebar 37 and a steering column 42, is provided generally forward of the seat 32. The steering column 42 is connected to the frame 18. The handlebar 37 is attached to the upper end of the steering column 42. The steering column 42 is connected to the upper structure 23 and disposed laterally between the forward braces 23a. The upper end of the steering column 42, extending above the junction 23c of the upper structure 23 has the handlebar 37 attached thereto. The handlebar 37 extends generally laterally outwardly from the steering column 42. The handlebar 37 is used to rotate the skis 16, in order to steer the vehicle 10. A left hand grip 38 and a right hand grip 40 are provided on the handlebar 37 to facilitate gripping.

Figure 2:
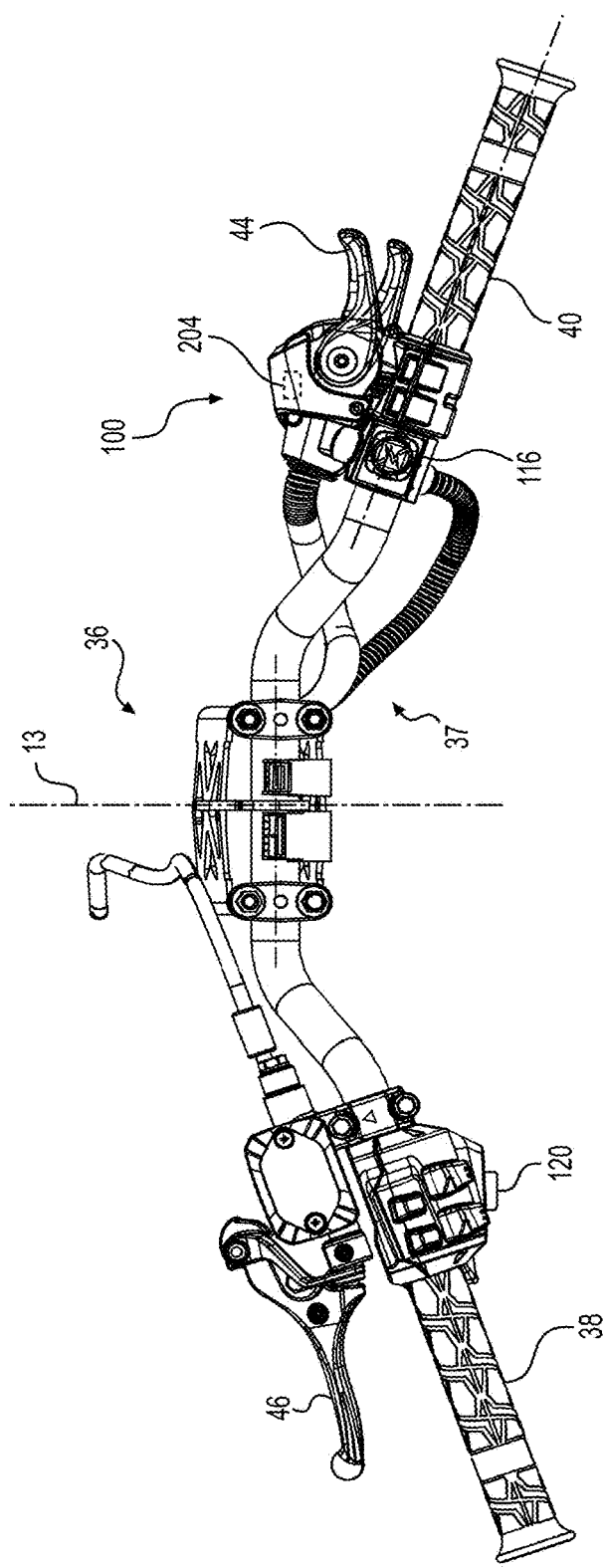
FIG. 2 is a top plan view of the handlebar of the snowmobile of FIG. 1.

With reference to FIG. 2, a throttle control module 100 is provided on the right side of the handlebar 37. The throttle control module 100 is connected to the ECU 200. The throttle control module 100 includes a throttle operator 44 in the form of a finger-actuated throttle lever 44 mounted to adjacent the right handgrip of the handlebar 37. Other types of throttle operators, such as a thumb-actuated throttle lever and a twist grip, are also contemplated. The throttle lever 44 is normally biased, typically by a spring, towards a position furthest away from the handlebar 37. This position of the throttle lever 44 is indicative of a desire for an idle operation of the engine 26. The throttle lever 44 can be pressed towards the handlebar 37 to increase air flow into the engine 26, and to thereby increase the output power of the engine 26 by means of a throttle-by-wire (TBW) system. U.S. Provisional Patent Application No. 61/666,443, filed on Jun. 29, 2012, the entirety of which is incorporated herein by reference, provides additional details of such throttle systems in vehicles. The throttle control module 100 also includes a throttle operator position sensor 204 connected to the throttle lever 44 for sensing the position of the throttle lever 44. A throttle operator position PP is defined as a fraction of its fully activated position (when throttle lever 37 is at its closest position to the handlebar 36). The throttle operator position PP thus varies between 0% (unactivated or idle position) and 100% (fully activated or "drive" position).

The snowmobile 10 also includes an engine cut-off switch 116. The engine cut-off switch 116 is a push-pull button switch connected to the ECU 200 for turning off the engine 26. The engine cut-off switch 116, extends upwards from the right side of the handlebar 37. The position of the engine cut-off switch 116 close to the right hand grip 40 enables the snowmobile driver to easily reach the engine cut-off switch 116 and to operate it to stop engine operations. The ECU 200 may terminate engine operation by preventing current flow to either the fuel pump or the fuel injectors to deprive the engine 26 of fuel, or it may stop current flow to the spark plugs to prevent fuel combustion in the engine 26. It is also contemplated that the ECU 200 may use two or more of these methods concurrently to stop snowmobile motion and/or engine operation. Other methods of preventing movement of the snowmobile 10 may be apparent to a person skilled in the art, and any of these other methods are considered to be within the scope of the present technology.

A brake actuator 46, in the form of a hand brake lever 46, is provided on the handlebar 37 for braking the snowmobile 10 in a known manner. The brake actuator 46 is placed adjacent to the left hand grip 38 on the left side of the handlebar 37.

A start-up switch 120, in the form of a push-button, is located on the left side of the handlebar 37 near the brake lever 46. The driver indicates a desire to start-up the engine 26 by actuating the start-up switch 120, i.e. by pushing the start-up switch 120 to an "ON" position. In the illustrated implementation of the snowmobile 10 with a starter motor 43 for starting the engine 26. The starter motor 43, when activated, selectively engages a flywheel connected to a crankshaft (not shown) of the engine 26 and thereby rotates the crankshaft to start the engine 26. It is contemplated that the starter motor 43 could be omitted and a starter cord or rope 122 could be connected to the flywheel to rotate the crankshaft and start operation of the engine 26. Thus, instead of pushing a button, the driver could pull a rope 122 to start-up the engine 26 as discussed in the implementation of FIGS. 17 to 19.

With reference to FIGS. 3A to 3C, the snowmobile 10 is provided with a security system 130 such as, for example, Bombardier Recreation Product's Digitally Encoded Security System (DES™). The security system 130 includes a key receiver 132 and a key 134 tied to a lanyard 136. The key receiver 132 is in the form of a metal cylinder positioned in front of the seat 32 on the right side of the upper end of the steering column 42 and below the right side handlebar 37. The cup-shaped key 134 fits over the key receiver 132. The key 134 includes a magnet and a digitally encoded chip containing identification information.

The key receiver 132 comprises a reed switch 138 which can be actuated by a magnetic field. When the key 134 is installed on the key receiver 132, the magnet in the key 134 closes the reed switch 138. When the key 134 is removed from the key receiver 132, the magnetic field due to the key magnet is removed, resulting in the reed switch 138 becoming open. The reed switch 138 is part of a security system circuit 140 which is completed when the reed switch 138 is closed. The security system circuit 140 further includes a security system transponder 142 and a battery 144. When the reed switch 138 is closed, the battery 144 is connected to the security system transponder 142. The transponder 142 is thus activated for receiving and sending signals. The security system transponder 142 communicates with the linked digitally encoded key 134 and the ECU 200.

The transponder 142 requests and receives the encoded identification information from the key 134. The transponder 142 transmits the encoded identification information to the ECU 200. The ECU 200 decodes the identification information and compares the identification information of the security system key 134 with a database of authorized identification codes to determine whether the security system key 134 is authorized for operating the snowmobile 10. The database of identification codes is previously stored in a memory of the ECU 200. It is also contemplated that the transponder 142 decodes the identification information. It is further contemplated that the authorization status of the key 134 is verified by the transponder 142, which then transmits the authorization status to the ECU 200. The database of authorized identification codes could additionally be stored in a memory of the security system transponder 142, or the transponder 142 could access the database from the ECU 200.

It should be understood that the security system 130 having a magnetic cup-shaped key 134 and complementary key receiver 132 with a reed switch 138 described above is only meant to be exemplary. Other systems for verifying authorization are also contemplated. For example, the key 134 could be in the form of a ring or a card having encoded identification information. The identification codes could be stored in areas of the key 134 that are magnetically/electrically/optically sensitive and capable of communicating with complementary areas of a key receiver 132. The key 134 could be inserted into, swiped, waved or otherwise brought in proximity of the key receiver 132. The identification code of the key 134 could be read by a transponder 142 when in proximity thereto without requiring contact. The key 134 could also be similar to a conventional mechanical key have physical features such as a surface, edge, protrusions and the like, and the key receiver 132 could have spring-loaded portions actuated via mechanical contact (or lack thereof) when the key 134 is inserted or otherwise coupled thereto. Thus, the term "key" as used herein is meant to encompass any element having identifiable or distinguishable features, including a digital identification code. The term "identification" referred to herein is intended to broadly encompass any distinguishing characteristic of a "key". The term "key receiver" as used herein is intended to encompass a second element that can be linked to the first element ("key") in such a way as to be able to distinguish at least one of a plurality of "keys".

The key receiver 134 is able to read the identification of the key 134 when the key 134 and the key receiver 132 are linked to each other. The term "read" is intended to encompass any means of sensing, detecting or distinguishing an identification feature of the key. The link between the key receiver 132 and the key 134 could be via physical contact, such as a mechanical contact or an electrical connection. The link could also be established without any physical contact. For example, the link could be a wireless link by means of electromagnetic, optical or radio-frequency communication, and the like. In the illustrated implementation, the key 134 is linked to the key receiver 134 by installing or placing the key 134 over the key receiver 134

With reference to FIGS. 3A and 3B, a lanyard 136 attached to an end of the key 134 is intended to be clipped to the driver of the snowmobile 10. If the snowmobile driver leaves the snowmobile 10, the key 134 fastened to the snowmobile driver by the lanyard 136, disengages from the key receiver 132. The engine 26 and other systems are deactivated when the security system key 134 is removed from the key receiver 132. The security system 130 thus also serves as a safety system for the snowmobile 10 terminating operation of the snowmobile 10 if the snowmobile driver is separated from the snowmobile 10 during operation.

Thus, the engine 26 and other systems of the snowmobile can be turned on or activated only if the key 134 is coupled to, or installed on, the key receiver 132. The engine 26 is operable only when an authorized security system key 134 is installed on the key receiver 132, the engine cut-off switch 116 is an "OFF" position or deactivated, and the start-up switch 120 is in an "ON" position. Various methods for starting up the snowmobile 10 will be discussed below in further detail.

With reference to FIGS. 7 and 8, the engine 26 drives an engine output shaft 54 that rotates about a horizontally disposed axis extending generally transversely to a longitudinal centerplane 13 of the snowmobile 10. In the present implementation, the output shaft 54 is a crankshaft of the engine 26. However, it is contemplated that the crankshaft and the output shaft 54 could be separate shaft connected to each other such that the crankshaft drives the output shaft 54. The engine output shaft 54 drives the transmission system 50 for transmitting torque to the endless drive track 28 for propulsion of the snowmobile 10. The transmission 50 (shown in FIG. 7, removed for clarity in FIG. 8) is connected to the drive sprocket 31 and rear track 28 via a reduction gear 57. The transmission 50 is disposed on the left side of the engine 26. The reduction gear 57 is disposed on the right side of the snowmobile 10. The transmission 50 is a continuously variable transmission (CVT) comprising a variable diameter drive pulley 51 coupled to a variable diameter driven pulley 52 by a belt 53. It is contemplated that other kinds of transmissions could also be used. The output shaft 54 of the engine 26 is connected to the drive pulley 51 of the CVT 50. The countershaft 55 of the CVT 50 is connected to the reduction gear 57, and thereby to the front drive axle 56 of the drive sprocket 31. The drive pulley 51 and the output shaft 54 rotate at an engine speed ES about a drive pulley rotation axis 51a. The driven pulley 52 and the countershaft 55 rotate about a drive pulley rotation axis 52a at a speed determined in accordance with the instantaneous ratio of the CVT 50. A CVT plane 50a is defined by the rotation axes 51a, 52a of the CVT pulleys 51, 52.

Each of the pulleys 51, 52 includes a movable sheave that can move axially relative to a fixed sheave to modify an effective diameter of the corresponding pulley 51, 52. The drive pulley 51 sheaves are biased away from each other so that when not rotating, the drive pulley sheaves are far apart and the belt 53 is disengaged from the drive pulley 51. The moveable sheave moves in response to changes in engine speed ES. The effective diameters of the pulleys 51, 52 are in inverse relationship. In the illustrated implementation, the CVT 50 is a purely mechanical CVT 50, in which the effective diameter of the drive pulley 52 depends on the engine speed ES and torque applied to the track 28. As the engine output shaft 54 and the drive pulley sheaves begin to rotate with increasing rotational speeds ES, the separation between the drive pulley sheaves decreases due to the action of a set of centrifugal weights pushing the moveable sheave towards the fixed sheave. At a certain engine speed ES, the drive pulley sheaves engage the belt 53 which in turn begins to rotate the driven pulley sheaves. The rotational speed ES (of the engine output shaft 54 and drive pulley sheaves 51) at which the drive pulley sheaves engage the belt 53 is referred to as the engagement speed $ES_{engage}$. It is also contemplated that the CVT 50 could be an assisted CVT having a hydraulic, pneumatic, or other system to control the effective diameter of the pulleys 51 or 52, and thus, the engagement speed $ES_{engage}$ of the CVT 50.

For rotational speeds ES greater than the engagement speed $ES_{engage}$, the engine 26 is operatively connected via the CVT 50 to the track 28. For rotational speeds ES less than the engagement speed $ES_{engage}$, the CVT 50 is not engaged and thus the powertrain 75 cannot deliver torque and power from the engine 26 to the tracks 28. The snowmobile 10 is thus not being driven by the engine 26, and the engine 26 is in idle operation for engine speeds ES less than the engagement speed $ES_{engage}$. Idle operation of the engine 26 enables powering of vehicle systems such as the displays 48, the ECU 200, and the like. The engine 26 can be placed in idle operation by releasing the throttle lever 44 without turning off the engine 26.

The engine 26 is an inline, three-cylinder, four-stroke, internal combustion engine. The cylinders are aligned with their cylindrical axes disposed vertically. A cylindrical plane 27 is formed by the parallel cylindrical axes of the cylinders. It is contemplated that the engine could be configured differently. For example, the engine 26 could have more or less than three cylinders, and the cylinders could be arranged in a V-configurations instead of in-line. It is contemplated that the engine 26 could be a two-stroke internal combustion engine, a carbureted engine, or any other suitable engine or motor capable of propelling of the snowmobile 10.

The engine 26 receives fuel from the fuel tank 58 via a fuel injection system 80. (FIG. 6). The engine 26 receives air from an air intake system 60. The air intake system 60 is connected to an air inlet 61 (FIG. 14) defined in the rear portion of the engine 26. The fuel-air mixture in the engine 26 is ignited by an ignition system 82. Exhaust gases resulting from the combustion process are expelled from the engine 26 via an exhaust system 90. Engine output power P, torque τ and engine speed ES are determined in part by the fuel-air mixture in the engine 26 and the ignition timing IT. An engine control unit (ECU) 200 is operatively connected to the engine 26 to control operation of the engine 26 as will be discussed below.

With reference to FIGS. 13 and 14, an exhaust outlet 94 is defined in the front portion of the engine 26. The exhaust system 90 includes an exhaust conduit 92 which is connected to the exhaust outlet 94 and extends forwardly therefrom to direct exhaust gases out of the engine. The air inlet 61 is disposed on the side opposite the exhaust outlet 94.

The air intake system 60, best seen in FIGS. 8, 14 and 15, includes a primary airbox 66, a throttle body 68 and a secondary airbox 62. Air enters the secondary airbox 62 through an inlet 64 in the front portion of the snowmobile 10. The air is then directed through the secondary airbox 62 rearwards and downwards behind the engine 26 into the throttle body 68, and from the throttle body 68 into the primary airbox 66 and finally into the engine 26 via the air inlet 61.

With reference to FIG. 8, the secondary airbox 62 is disposed above the engine 26 and extends partly forward of the engine 26 and the upper structure 23. The secondary airbox 62 is connected to the throttle body 68 by a conduit 69. The conduit 69 extends rearwardly and downwardly from the secondary airbox 62 to the inlet 68c of the throttle body 68

With reference to FIGS. 8 and 15, the throttle body 68 has a tubular structure, and extends rearwardly and downwardly from the conduit 69 to the primary airbox 66. The throttle body 68 is disposed rearwardly of the engine cylinder axis 27. The throttle body 68 is disposed rearwardly and lower than the apex 23c of the frame upper structure 23. The throttle body 68 is disposed below the forwardly extending portion of the fuel tank 58. The filler neck 59 of the tank 58 is longitudinally aligned with the throttle body 68. The throttle body 68 is disposed leftward of the longitudinal centerplane 13 as seen in FIG. 12. The outlet 68b of throttle body 68 is connected to the inlet of the primary airbox 66 as best seen in FIG. 8.

With reference to FIGS. 8 and 15, the primary air box 66 has a bulbous structure providing a voluminous chamber for equalizing air pressure of the air flow entering the engine 26. The primary airbox 66, is disposed below the forwardly extending upper portion of the fuel tank 58. The lower portion of the fuel tank 58 is disposed just rearward of the primary airbox 66. As best seen in FIG. 14, the primary airbox 66 is connected to the air inlet 61 of the engine 26.

With reference to FIGS. 4 to 5C, the throttle body 68 comprises a throttle valve 70. The throttle valve 70 regulates the amount of air flowing through the throttle body 68 entering into the engine 26, which determines in part the mixture of fuel and air burned in each combustion cycle of the engine 26, and thereby the power delivered by the engine 26. The throttle valve 70 is a butterfly valve comprising a circular disc 70*a* mounted inside the tubular throttle body 68 that rotates about a rod 70*b* passing diametrically through the disc 70*a*. The passage of air through the tubular throttle body 68 is obstructed by varying amounts as the disc 70*a* rotates about the rod 70*b*. The throttle valve 70 is in a fully open position (minimal obstruction of air flow) when the circular surface of the disc 70*a* is at its minimum angle with respect to the central axis 68*a* of the tubular throttle body 68, and in a fully closed position (maximal obstruction of air flow) when the circular surface of the disc 70*a* is at its maximum angle with respect to the central axis 68*a* of the tubular throttle body 68.

A throttle valve actuator 74, in the form of an electric motor, is operatively connected to the disc 70*a* to change the position of the disc 70*a* and thereby adjust the opening of the throttle valve 70. In the illustrated implementation of the throttle body 68, the throttle valve 70 and therefore the throttle valve actuator 74 are placed adjacent to the throttle body outlet 68*b* which connects to the primary airbox 66. It is however contemplated that the throttle valve 70 and/or throttle valve actuator 74 could be places at other positions along the throttle body 68 between the inlet 68*c* and outlet 68*b*.

A throttle valve position TVP can be defined in terms of a degree of opening of the throttle valve 70. The throttle valve position TVP is defined as a fraction of its fully open position and thus varies from 0% (fully closed) to 100% (fully open). A throttle valve sensor 72 is connected to the throttle valve 70 to sense the throttle valve position TVP. In the illustrated implementation, the throttle valve position sensor 72 is integrated with the actuator 74, but it is contemplated that the actuator 74 and sensor 72 could be separate. The throttle valve actuator 72 positions the throttle valve 70 based at least in part on a position PP of the throttle lever 37 of the snowmobile 10. The actuator 74 is controlled based in part on signals received from the ECU 200, which are based on signals received by the ECU 200 from the throttle position sensor 204, the throttle valve position sensor 72, and other input signals such as the engine speed ES and the like.

With reference to FIGS. 7 to 15, the throttle valve actuator 74 attached to the throttle body 68 is placed between the fuel tank 58 and the engine 26. The throttle valve actuator 74 is disposed below a forwardly extending portion of the fuel tank 58 containing the filler tube 59. The throttle valve actuator 74 is disposed lower than the upper surface of the seat 32 in the vertical direction and between the left and right lateral surfaces of the seat 32 in the lateral direction. The throttle valve actuator 74 is disposed rearward of a CVT plane 50*a*. A portion of the throttle valve actuator 74 is disposed longitudinally within a projection of the circumferential edge of the driven pulley 52 on to the longitudinal centerplane 13. A portion of the throttle valve actuator 74 is also laterally disposed within the projection of the circumferential edge of the driven pulley 52 on to the longitudinal centerplane 13. In the lateral direction, the throttle valve actuator 74 is disposed between the longitudinal centerplane 13 and the rear left brace 23*b* of the frame upper structure 23. The throttle valve actuator 74 is thus disposed within the pyramidal structure formed by the upper structure 23.

With reference to FIGS. 4 and 6, the ECU 200 controls operation of the snowmobile 10. The ECU 200 receives signals from various sensors in order to control operation of the snowmobile 10. The ECU 200 sends signals to various components connected to the engine 26 based on the information received from the various sensors in order to control the operation of the engine 26 and other components of the snowmobile 10.

The throttle operator position sensor 204 senses a position PP of the throttle operator 44 (finger or thumb actuated throttle lever 44 in the illustrated implementation of the snowmobile 10) and sends a signal representative of the throttle operator position PP to the ECU 200. Depending on the type of throttle operator 44, the throttle operator position sensor 204 is generally disposed in proximity to the throttle operator 37 and senses the movement of the throttle operator 44 or the linear displacement of a cable connected to the throttle operator 44.

The ECU 200 sends a signal to the throttle valve actuator 74 to adjust the position TVP of the throttle valve 70, and thereby the air flow through the throttle body 68. The throttle valve position TVP is adjusted based in part on the throttle operator position PP as well as on other factors such as the ignition timing IT, required output power P and torque τ, and the like.

The throttle valve position sensor 72 senses the position (i.e. the degree of opening) of the throttle valve 70 and sends a signal representative of the position TVP of the throttle valve 70 to the ECU 200. The throttle valve position sensor 72 acts as a feedback to the ECU 200 since the ECU 200 uses the signal received from the throttle valve position sensor 72 to determine if the throttle valve actuator 74 has moved the throttle valve 37 to the desired position and can make adjustments accordingly. The throttle valve position sensor 72 can be any suitable type of sensor such as a rheostat, hall-effect sensor, potentiometer, and the like. Depending on the type of throttle valve actuator 74 being used, a separate throttle valve position sensor 72 may not be necessary. For example, a separate throttle valve position sensor 72 would not be required if the throttle valve actuator 74 is a servo motor since servo motors integrate their own feedback circuit that corrects the position of the motor and thus have an integrated throttle valve position sensor 72. In a carbureted engine, the throttle valve 70 is located inside the carburetor and the throttle body 68 is replaced with a carburetor body. For the purposes of the present, the term "throttle body" refers to a carburetor as well as a throttle body.

An engine speed sensor 208 senses the rotational engine speed ES of the output shaft 54 of the engine 26 and sends a signal representative of the engine speed ES to the ECU 200. The engine speed sensor 208 is a hall-effect type sensor coupled to a trigger wheel on the engine output shaft 54. It is contemplated that the engine speed sensor 208 could be coupled to any rotating shaft of the engine 26, such as the crankshaft. The rotation speed ES of the engine 26 can be used by the ECU 200 to calculate the engine torque τ and the power output P of the engine 26.

A vehicle speed sensor 202 senses the speed VS of the snowmobile 10 and sends a signal representative of the speed VS of the snowmobile 10 to the cluster 48. It is contemplated that the vehicle speed sensor 202 could also send a signal representative of the speed VS of the snowmobile 10 to the ECU 200. The vehicle speed sensor 202 is a hall-effect sensor coupled to a trigger wheel on a driveshaft, such as the drive axle 55 or a jackshaft of the reduction gear 57 so as to sense a rotational speed thereof. It is contemplated that the vehicle speed sensor 202 could sense a speed of any shaft driven by the driven pulley 52 (i.e. any shaft connected between the driven pulley 52 and the track 28), including shafts inside the reduction gear 57, to determine the speed of the snowmobile 10. It is contemplated that any suitable type of vehicle speed sensor 202 could be used. Alternatively, the vehicle speed sensor 202 could include a global positioning system (GPS unit). By using information from the GPS unit, the speed of the vehicle 10 can be determined by calculating a change in position of the vehicle 10 over a period of time which is normally a function of the GPS unit.

In addition to the throttle valve 70 mentioned above, the ECU 200 is also connected to the fuel injection system 80 including fuel pumps 86 (FIG. 14) and fuel injectors 84 (FIG. 9) for controlling the fuel supply to the engine 26.

The ECU 200 is connected to the ignition system 82 to control ignition of the fuel-air mixture in the combustion chamber of the engine 26. For example, the ECU 200 controls the ignition timing IT based partly on the throttle valve position TVP, the throttle operator position PP, and/or engine speed ES. The ECU 200 is also connected to the fuel injection system 80 to control fuel injection into the engine 26.

The ECU 200 is connected to the display cluster 48 to control display of information thereon. The ECU 200 sends signals to the display cluster 48 to display information regarding engine speed, vehicle speed, and the like.

The ECU 200 is connected to the engine cut-off switch 116 to determine if engine operations need to be terminated.

The ECU 200 is connected to the start-up switch 120 to determine when the driver desires to commence operation of the engine 26.

The ECU 200 is connected to the security system 130 to verify that the driver is authorized to operate the snowmobile 10, and to terminate vehicle and/or engine operation in the event of an emergency.

Other sensors (not shown) may also connected to the ECU 200, such as a manifold pressure sensor, an engine coolant temperature sensor, an air flow sensor, an intake air temperature sensor, fuel temperature and pressure sensors, transmission sensor and the like. It is contemplated that the ECU 200 could only be connected to some of these components and not to others. It is also contemplated that the snowmobile 10 could not include all of these components. For example, the engine 26 could be supplied with fuel via a carburetor, in which case the snowmobile 10 would not include a fuel injector.

It is contemplated that the ECU 200 could be separated into multiple units each having one or more of the functions described above and further below.

The ECU 200 controls operation of the engine 26 based on specific control schemes or map provided to the ECU 200. The control maps provide information related to various parameters (such as throttle valve position, throttle operator position, fuel injection, ignition timing, engine torque, power output, etc.) needed for operation of the engine 26. For example, a control map could provide information regarding the variation of throttle valve position TVP and engine speed ES for achieving a particular power output or engine torque. The ECU 200 may also use algorithms, in addition to the control maps, to determine some of the parameters.

As can also be seen in FIG. 6, the engine 26 has a magneto 96. The magneto 96 is mounted to and driven by the crankshaft of the engine 26. When the magneto 96 rotates with the crankshaft, it generates electrical power to be supplied to at least the electrical components mentioned above, including the ECU 200.

With Reference to FIG. 16, a method of starting engine operation will now be described.

The method 300 is initiated at step 305 when a key 134 is linked to the security system receiver 132. The coupling of the key 134 in the key receiver 132 completes a security system circuit 140 when a reed switch 138 is closed at step 310.

The method 300 then proceeds when the snowmobile driver activates the engine start-up button 120 at step 315 to indicate a desire to commence engine operation. In a snowmobile without a starter motor 43, instead of pushing a start-up button 120, the snowmobile driver pulls a starter 122 (FIG. 6) to rotate the flywheel mounted to the crankshaft of the engine 26, thereby rotating the crankshaft to begin engine operation.

At step 320, the ECU is activated. The battery 144 is connected to the ECU 200 to activate the ECU 200. In the implementation of the snowmobile 10, having a starter rope 122 instead of a start-up switch 120, the ECU 200 could also be activated by the power generated by the rotation of the engine crankshaft as a result of the starter rope 122 being pulled. The activation of the ECU 200 also starts an ECU timer.

The ECU 200 then checks the status of the engine cut-off switch 116 at step 325. If the engine cut-off switch 116 is determined to be deactivated, the method 300 proceeds to step 330. If the engine cut-off switch 116 is determined to be activated, the method 300 remains at step 325 until the engine cut-off switch 116 is deactivated.

The ECU 200 checks the reed switch 138 at step 330. If the reed switch 138 is determined to be in an "on" or "closed" position (i.e. the key 134 is installed properly and the security system circuit 140 is complete), the method 300 proceeds to step 335. If at step 330, the reed switch 138 is determined to be in an "off" or "open" position (i.e. the key is not installed properly and the security system circuit 140 is incomplete), the method 300 returns to the first step 305. The security system key 134 has to be re-installed so that the method 300 can recommence from step 305.

It will be understood that the steps 325 and 330 can be performed in the reverse order. In some implementations, the step 330 is omitted since the method 300 does not proceed past the step 310 unless the reed switch 138 is closed. The reed switch 138 closes (step 310) only if the key 134 is installed properly thereby completing the security system circuit 140. If the security system circuit 140 is not complete, the battery 144 cannot be connected to the ECU 200 or to other systems, and therefore the ECU 200, the engine 26 and other related systems cannot be activated. Thus, if the reed switch 138 is not closed and the security system circuit 140 is not complete, pushing the engine start-up button 120 would not activate any systems of the snowmobile 10.

If the ECU 200 determines that the engine cut-off switch 116 is deactivated and the reed switch 138 is closed, at step 335 the ECU 200 communicates with the throttle control module 100 to determine if the throttle operator position PP is set at a position greater than a limit, $PP_{limit}$. The method 300 proceeds to the next step 340 to commence engine operation only if the throttle operator position PP is either less than or equal to the limit position $PP_{limit}$. The throttle operator position PP could be greater than the limit position $PP_{limit}$ if the throttle lever 44 is being pressed by the snowmobile driver, or if the throttle lever 44 is not at its idle position but stuck at a position PP greater than the limit position $PP_{limit}$, for some other reason. If the throttle operator position PP is greater than the limit position $PP_{limit}$, the method 300 does not allow engine operation to commence and returns to step 315. The snowmobile operator has to release the throttle lever 44 or ensures that the throttle lever 44 is at a position PP equal to or less than the limit position $PP_{limit}$, before pressing the start-up button 120 again to recommence the method 300. It is also contemplated that at step 335, instead of, or in addition to checking the throttle operator position PP, the ECU could also determine whether the throttle valve position TVP is above a certain limit position $TVP_{limit}$. If neither the throttle operator position nor the throttle valve position TVP is at a position greater than the corresponding threshold positions, the method 300 would then proceed to step 340.

If at step 335, the ECU 200 determines that the throttle operator position PP is either less than or equal to the limit position $PP_{limit}$, then at step 340, the ECU 200 allows current from the battery 144 to flow to the starter motor 43 to rotate the crankshaft for the combustion process. At step 340, the throttle valve position TVP is allowed to be adjusted based at least in part on the throttle operator position PP. It should be understood that the throttle valve actuator 74 controls the throttle valve 72 based on the throttle operator position PP such that the throttle valve position TVP is a function thereof, i.e. TVP=ƒ(PP), not necessarily directly proportional to the throttle operator position PP. The functional relationship of the throttle valve position TVP on the throttle operator position PP could depend on factors such as a mode of operation of the vehicle, and the like. At step 340, the ECU 200 also activates other electrical systems connected to the engine 26 such as the fuel pump 80, the ignition system 82 and the like. Once the electrical systems connected to the engine 26 are turned on, the method 300 monitors the engine speed ES.

At step 345, if the ECU timer value t is less than a time period T1, the method proceeds to step 350.

At step 350, if the engine speed ES is determined to be at least equal to a first threshold engine speed $ES_{T1}$, the method 300 proceeds to step 375. If at step 350, the engine speed ES is determined to be less than the first threshold engine speed $ES_{T1}$, the method returns to step 345. Thus, the method 300 circles between steps 345 and 350 to monitor the engine speed ES either until the timer value is at least equal to the time period T1 or the engine speed ES increases above the first threshold $ES_{T1}$.

If the ECU timer value is at least equal to T1 at step 345 and the engine speed ES has failed to increase above the first threshold engine speed $ES_{T1}$, as determined at step 350, the method 300 proceeds to step 355 to limit the throttle valve position TVP. The ECU 200 sends a signal to the throttle valve actuator 74 to limit the throttle valve exposition TVP to be below a first limit position $TVP_{limit1}$. The value of the first limit throttle valve position $TVP_{limit1}$ is preset. In the illustrated implementation, the first limit throttle valve position $TVP_{limit1}$ is preset at 0% (closed position of the throttle valve 70). It is contemplated that the first limit throttle valve position $TVP_{limit1}$ could be any value between 0 (the closed position of the throttle valve 70) and 100% (fully opened). From step 355, the method 300 proceeds to step 360.

At step 360, if the ECU timer value t is less than a time period T2, the method proceeds to step 365. The time period T2 is greater than the time period T1.

At step 365, the engine speed ES is compared to a second threshold engine speed $ES_{T2}$. If the engine speed ES is determined to be at least equal to a second threshold engine speed $ES_{T2}$, the method 300 proceeds to step 375. In the illustrated implementation, the second threshold engine speed $ES_{T2}$ is set to have to the same value as the first threshold engine speed $ES_{T1}$. It is however contemplated that the second threshold engine speed $ES_{T2}$ could be smaller than or greater than the first threshold engine speed $ES_{T1}$.

If at step 365, the engine speed ES is determined to be less than the second threshold engine speed $ES_{T2}$, the method returns to step 360. Thus, the method 300 circles between steps 360 and 365 to monitor the engine speed ES either until the ECU timer value t is at least equal to the time period T2 or the engine speed ES is at least equal to the second threshold $ES_{T2}$.

If at step 360, the ECU timer value is at least equal to the second time period T2, the method 300 proceeds to step 370 to place the engine 26 in a "sleep" mode. All the electrical systems including the ECU 200 are deactivated and disconnect from the battery 144. Engine operation thus fails to commence, and can be restarted again only by reinserting the key 134 into the key receiver 132 at step 305, or by pushing the start-up button 120. If the engine speed ES rises to at least the second threshold engine speed $ES_{T2}$ (step 365) before the timer value t equals the time period T2 (step 350), the method 300 proceeds to step 375.

In the illustrated implementation, the ECU timer is started at step 320 when the ECU 200 is powered at step 320. The threshold time periods T1 and T2 are defined with respect to this start time. It is however contemplated that the timer could be started at a different time, for example, when the engine speed ES has reached a certain value, or when a system other than the ECU 200 is activated. It is contemplated that the threshold time periods T1 and T2 could be defined with respect to an event other than the timer being started, or the ECU 200 being activated.

At step 375, the method 300 determines if the engine speed ES is at least equal to a transponder threshold engine speed $ES_{trans}$, the engine speed ES at which the engine 26 generates enough power to enable the transponder 142 to read the identification code of the key 134 and to communicate with the ECU. The method 300 waits at step 375 until the engine speed ES increases to at least the transponder threshold engine speed $ES_{trans}$ before proceeding to step 380.

At step 380, the identification code of the key 134 is obtained by the ECU 200. The transponder 142 reads the identification code contained in the identification chip of the key 134 linked to the key receiver 132. The ECU 200 transmits an ID request signal to the transponder 142 and receives a response signal from the transponder 142 which contains the identification data.

In the illustrated implementation, the transponder threshold engine speed $ES_{trans}$ is greater than the threshold engine speeds $ES_{T1}$ or $ES_{T2}$. It is also contemplated that the transponder threshold engine speed ES could be less than the threshold engine speeds $ES_{T1}$ or $ES_{T2}$. It is contemplated that the identification code of the key 134 (step 380) could be read before the engine speed ES has increased to the threshold engine speeds $ES_{T1}$ or $ES_{T2}$. It is contemplated that the step 375 could be omitted. For example, the identification code could be read at step 340 when the throttle valve actuator 74 and other systems of the engine 26 are activated. In this case, the transponder 142 is powered by the battery 144 for reading the identification chip of the key 134 and for communication with the ECU 200.

At step 385, the ECU 200 determines whether the installed key 134 is authorized for operation of the snowmobile 10. It is also contemplated that the authorization of the key 134 could be determined by the security system 130 and the result transmitted to the ECU 200. As mentioned above, the determination of the authorization status of the installed key 134 is performed by comparing the decoded identification data with one or more authorized identification codes previously stored in an ECU memory (or DESS memory).

If the identification data does not correspond to an authorized identification, the ECU 200 determines that the installed key 134 is unauthorized for operation of the snowmobile 10 and proceeds to steps 390 and 395 to prevent further operation of the snowmobile 10.

At step 390, the ECU 200 sends a signal to the throttle valve actuator 74 to limit the throttle valve position TVP below a security limited throttle valve position $TVP_{security}$. In the illustrated implementation, the security limited throttle valve position $TVP_{security}$ is contemplated to be less than a throttle valve position TVP that would produce an engine speed ES that is less than the CVT engagement speed $ES_{engage}$.

At step 395, method 300 prevents engine operation. The engine 26 will be stopped if it has already started. The engine 50 will be prevented from starting if it has not already started. The engine 26 is considered to have started if the engine speed ES is at least enough to sustain combustion and operation of the engine and related systems (fuel injection 80, ignition 82, etc.) without being connected to the battery 144. The engine speed ES at which the engine is considered to have started up is smaller than the engine speed $ES_{engage}$.

Thus, at step 395, if the engine 26 has already started, the ECU 200 disconnects the fuel injection system 80, the ignition system 82, the fuel and oil pumps 86 and other electrical systems connected to the battery 144 and the engine 26 to deactivate these systems. If the engine 26 has not yet started, and if one or more of these systems are being powered by the battery 144, they will be deactivated by disconnecting them from the battery 144 in order to prevent draining of the battery 144.

It is contemplated that step 395 could be omitted and that if the installed key 134 is determined to be unauthorized, the ECU 200 would only limit the throttle valve position to the position $TVP_{security}$ without also preventing engine operation. It is also contemplated that a wait time could be included between the step 390 and 395. It is further contemplated that an indication of authorization failure may be displayed to the operator, for example, by flashing an indicator light, or displaying a message on the display cluster 48, or by emitting a sound.

If at step 385, the installed key 134 is determined to be authorized, the method 300 proceeds to step 400 to allow further operation of the engine 50. The ECU 200 sends a signal to the throttle valve actuator 74 to enable positioning of the throttle valve 70 based on the position of the throttle lever 44. Thus, the throttle valve position TVP is allowed to increase beyond the limit position $TVP_{limit1}$ if it was so limited at step 355.

It is further contemplated that the transponder threshold engine speed $ES_{trans}$, be less than the first limit threshold $TVP_{limit1}$, and the identification code could be read before the step 345. Thus, in some implementations, the steps 380 to 395 are performed before step 345.

Another implementation of a security system 130' and method of operating the snowmobile will now be described with reference to FIGS. 17, 18 and 19. The security system 130' has some features that are similar to the corresponding features of the security system 130 described above. Corresponding and similar features of the security systems 130, 130' have been labeled with the same reference numbers and will not be described again herein in detail.

The security system 130' includes a key receiver 132' and a key 134'. Similar to the key receiver 132 of FIG. 3A, the key receiver 132' is in the form of a metal cylinder positioned in front of the seat 32 on the right side of the upper end of the steering column 42 and below the right side handlebar 37. Similar to the key receiver 132 of FIG. 3A, the key 134' is cup-shaped and fits over the key receiver 132. The security system 130' uses radio frequency identification (RFID) for determining the authorization status of a user of the snowmobile 10. The key 134' includes a magnet 146 and an RFID tag 148 including encoded identification information. The key 134' can be connected to a lanyard 136 as described above. The key receiver 132' includes an RFID reader 150 and a sensor 152 sensitive to the magnetic field of the key magnet 146. The sensor 152 is therefore referred to herein as a magnetic sensor 152. When the key 134' is installed on the key receiver 132', the magnetic field of the key magnet 146 can be sensed by the magnetic sensor 152 if the magnetic sensor 150 is powered. When the key 134' is installed on the key receiver 132', the RFID tag 148 can be read by the RFID reader 150 if the RFID reader is powered.

The key receiver 132' has a first power connector P1, a first power line 156 connected to the first power connector P1, a second power connector P2, a second power line 158 connected to the second power connector P2, and ground connector 154. Each of the power connectors P1 and P2 is connected to a power source (not shown) such as a magneto 96 or alternator of the engine 26. The RFID reader 150 is connected to both power lines 156 and 158, and thereby to both power connections P1 and P2. The magnetic sensor 152 is connected to the power line 156, and thereby to the power connection P1. The magnetic sensor 152 has a terminal connected to the ground connection 154.

The key receiver 132' is connected to the ECU 200 for controlling the functioning of the RFID reader 150 and the magnetic sensor 152. The ECU 200 is also connected to the power connectors P1 and P2 for controlling whether or not the power connectors P1 and P2 are providing power to the lines 156 and 158 respectively. The power connectors P1 and P2 may include one or more switches and/or other circuit elements for effecting the control as described below.

In the illustrated implementation, P1 is a power connector that provides power in the power line 156 at a lower voltage than P2, and P2 is a power connector that provides power in the power line 158 at a higher voltage than P1. In the illustrated implementation, P1 provides power up to 5V and P2 provides power at 12V. It is contemplated that the actual voltage levels of the power provided by the power connections P1 and P2 could be different than as disclosed herein and that the voltages may fluctuate from the given values.

In the illustrated implementation, both of the power connectors P1 and P2 are connected to the same power source, namely the engine 26. In the illustrated implementation, the engine 26 has a magneto 96 and is started up manually by pulling a rope 122 attached to the magneto 96. An exemplary implementation of a manual starting system having a rope to be pulled is shown and described in U.S. Pat. No. 4,422,417, issued Dec. 27, 1983, the entirety of which is incorporated herein by reference. The magneto 96 generates power as it turns in response to the pull of the rope 122. The rope 122 can be pulled repeatedly in order to continue power generation by the magneto 96. The power generated each time the rope 122 is pulled depends on the force with which the rope 122 is pulled—the greater the pulling force on the rope 122, the greater the power generated. The voltage of the power obtained from the magneto 96 while the rope 122 is being pulled is lower than that obtained if the engine 26 was provided with a battery and an electric starter motor 43. The voltage of the power generated by the engine 26 is also lower during manual start-up of the engine 26 than when the engine 26 is operating at higher engine speeds (1200 RPM, for example) after start-up. The ECU 200 controls the power connector P1 such that P1 is active during the start up procedure, i.e. while the rope 122 is being pulled for a manual start-up of the engine 26. Thus the power line 156 provides low voltage power during start-up of the engine 26. The ECU 200 controls the power connector P2 such that P2 is active after the engine 26 has started up and when the engine 26 has achieved operational engine speeds (i.e. the engine 26 is capable of sustaining its momentum). In other words, the power line 158 provides high voltage power after the engine started up. In some implementations, the power line 158 delivers power when the engine speed is above a threshold engine speed.

The magnetic sensor 152 is a low power sensor in the form of a hall effect sensor. The hall effect sensor 152 senses the magnetic field of the key magnet 146 when the key 134' is brought in proximity to the key receiver 132'. The low power hall effect sensor 152 can be operated using the low voltage power generated by the magneto 96 when it is starting up as a result of rope-starting of the engine 26. In the illustrated implementation of FIGS. 16 and 17, the key 134' is installed in the key receiver 132' before pulling on the rope 122 connected to the magneto 96 for starting up the engine 26. While it is desirable to prevent the engine 26 from starting up unless the key 134' is installed in the key receiver 132', it is undesirable for the operator of the snowmobile 10 to have to pull the rope 122 repeatedly in order to start-up the engine 26. The low power sensor hall effect sensor 152 enables the detection of the key 134' within one rope-start attempt. The power requirement of the sensor 152 is also low enough to permit powering of the ECU 200 to initiate other procedures for starting the combustion cycle of the engine 26 with the energy obtained from a single pull of the rope 122, as will be described below.

Although the present description is being provided with reference to a low power sensor 152 in the form of a magnetic sensor, specifically a hall effect sensor, it should be understood that other kinds of low power magnetic and non-magnetic sensors are also contemplated. The key magnet 146 could be a magnetic element which is sensitive to a magnetic field without being a magnet, and the sensor 152 could be magnetic sensor 152 other than a hall effect sensor which is configured to detect the presence of the magnetic element. The sensor 152 could also be a sensor operating under a principle other than magnetism, in which case the key magnet 146 of the key 134' would be replaced with an element associated with the type of sensor being used.

With reference to FIGS. 17, 18 and 19, another implementation of a method 400 of controlling operation of the snowmobile 10 will be described. The method 400 is described below with reference to a manual start-up of the engine 26 but it should be understood that aspects of the method 44 are also applicable to an electronic or battery assisted start-up of the engine 26.

The method 400 is commenced at step 410 by pulling the rope 122 connected to the magneto 96. The ECU 200 is activated as soon as the rope 122 is pulled. In addition, when the rope 122 connected to the magneto 96 is pulled, power generated by the engine 26 (i.e. magneto 96) is delivered via the power line 156 to the sensor 152.

Power in the power line 156 is represented by the signal 162 in FIG. 18. As can be seen in FIG. 18, the voltage of the power line 156 increases with time (assuming that the rope 122 is pulled at time t=0) until it reaches a voltage level $V_{low}$ at time $t_1$. $V_{low}$ is the voltage level at which the sensor 152 can be operated. As mentioned above, $V_{low}$ is 5V in the illustrated implementation, but it is contemplated that $V_{low}$ could be more or less than 5V. The power line 156 continues to deliver power at the voltage $V_{low}$ unless the engine 26 start-up procedure fails due to reasons described below. If the engine 26 is successfully started up, power line 156 continues to deliver power at the voltage $V_{low}$ until the operation of the engine 26 is terminated, or unless the key 134' is removed from the key receiver 132'.

At step 420, the sensor 152 is activated at time $t_2$ which is after the voltage level of the power line 156 reaches a $V_{low}$, at time $t_1$. The sensor 152, when activated, detects the presence or absence of the key card 134'. The sensor 152 sends a signal 164 (FIG. 18) to the ECU 200 indicative of the presence or absence of the key 134'. The signal 164 has a non-zero voltage as long as a key 134' is detected by the sensor 152'.

At step 430, if the ECU 200 determines that the key 134' has not been detected by the sensor 152, the method 400 proceeds to step 435 where start up of the engine 26 is terminated. At step 430, if the key 134' is determined to have been detected by the sensor 152, the ECU 200 proceeds to step 440 in order to continue the engine start-up procedure.

At step 440, the ECU 200 begins powering other components, such as the fuel pump, fuel injection and ignition systems 80, 82, in order to achieve combustion in the engine 26. The power delivered to the fuel pump is represented by the signal 166 in FIG. 18. The power delivered to the fuel injector is represented by the signal 168 in FIG. 18. The power delivered to the ignition system is represented by the signal 170 in FIG. 18.

First, the fuel pump is activated. As can be seen in FIG. 18, the signal 166 to the fuel pump comprises a single initial pulse starting at time $t_3$ followed by a constant uniform voltage signal starting at a time $t_6$. After time $t_6$, the fuel pump receives power constantly for continuous operation of the fuel pump. Continuous operation of the fuel pump requires more power than that generated by a single pull of the rope 122 connected to the magneto 96. Pulsed operation of the fuel pump uses a smaller amount of power than a continuously operating fuel pump. The fuel pump is therefore initially powered by a voltage pulse. The voltage pulse for initial operation of the fuel pump is of a magnitude ($V_{fpump}$) and a duration to sufficiently pressurize the fuel lines to enable at least one fuel injection cycle of the fuel injector. The duration of the pulse of the fuel pump signal 166 is 10 milliseconds in the illustrated implementation but it is contemplated that the pulse width of fuel pump signal 166 could be other than 10 milliseconds. It is also contemplated that the magnitude of the fuel pump signal 166 could be different than illustrated.

Once the fuel lines (not shown) are pressurized as a result of the voltage pulse delivered to the fuel pump at time $t_3$, the fuel injector is powered at time $t_4$ in order to inject fuel from the fuel lines in to the combustion chamber f the engine 26. The power 168 is delivered to the fuel injector in the form of pulses at a regular frequency. Each pulses of the signal 168 causes a predetermined amount of fuel to be injected into the combustion chamber for ignition. The ECU 200 accesses control maps to determine the predetermined amount of fuel. The amount of fuel injected for each pulse of the fuel injector signal 168 is based in part on parameters such as the current engine speed ES, the ambient temperature, the temperature of the engine coolant, and the like. The magnitude and width of the fuel injector signal 168 pulse is determined based on the amount of time and power needed to inject the predetermined amount of fuel. The ignition system is then sent a short voltage pulse (see signal 170 in FIG. 18) after each pulse of the signal 168 to create a spark across a spark plug of the ignition system. The time interval between a pulse of the fuel injection signal 168 and a corresponding pulse of the ignition signal 170 is predetermined based on the physical characteristic of the particular engine 26 and the desired performance characteristics of the engine 26.

With reference to FIG. 18, at time $t_6$, the engine 26 achieves continuous combustion. The fuel pump is continuously powered, and the fuel injector pulses (signal 168) and the ignition system pulses (signal 170) are delivered at a higher frequency than prior to the time $t_6$. If continuous combustion is not reached in response to a single pull of the rope 122, the rope 122 of the magneto 96 may be pulled again in order to generate additional power for achieving continuous combustion.

Depending on the speed with which the rope 122 is pulled, and therefore the total power generated by the magneto 96, a second cycle of fuel injection and ignition could be attempted before the rope 122 needs to be pulled again. If the speed with which the rope 122 is pulled, or the amount of rope 122 pulled, is not sufficient to generate enough power for a second cycle of fuel injection and ignition, the rope 122 will have to be pulled a second time in order to have a second cycle of fuel injection and ignition. It should be understood that the amount of time available for fuel injection and ignition cycles for starting up the engine 26 depends partly on the amount of time taken to execute step 420. If the step 420 where the sensor 150 is activated and the key 154' is detected does not occur quickly enough after the rope 122 is pulled, then there will not be sufficient time to follow up with the fuel injection and ignition cycles for starting up the engine 26. In the illustrated implementation, the ECU 200 determines that a key 134' has been detected by the sensor 152 within 100 milliseconds after the rope 122 has been pulled which corresponds to 25% of the full length of the rope 122 having been pulled which leaves enough time and generates enough power for activating other components of the engine 26.

With reference to FIG. 18, a signal 172 is shown which represents the power used for operation of all of the components such as the fuel pumps, fuel injectors, ignition systems and the like. After the rope 122 of the magneto 96 is pulled, the power used for operation of the various components increases with time at first, and then remains constant. In the implementation illustrated in FIGS. 17 and 18, the voltage level of this constant power is 55V. It is however contemplated that the voltage level of this contact power could be other than 55 volts.

At step 450, the method 400 determines if the engine speed ES is at least equal to a reader threshold engine speed $ES_{reader}$. When the engine speed ES is at least equal to the reader threshold engine speed $ES_{reader}$, the magneto 96 is able to generate enough power to enable the RFID reader 150 to read the identification code of the RFID tag 148. The method 400 waits at step 450 until the engine speed ES increases to at least the reader threshold engine speed $ES_{reader}$ before proceeding to step 460. In the illustrated implementation, the reader threshold engine speed $ES_{reader}$ is 1200 rpm and the RFID reader is powered by a 12V signal. It is contemplated that the reader threshold engine speed $ES_{reader}$ could be greater or smaller than 1200 rpm depending on the particular configuration of the engine 26 and the RFID reader 150. It is also contemplated that the RFID reader 150 could be powered by a voltage other than 12V. The reader threshold engine speed $ES_{reader}$ is lower than a CVT engagement speed $ES_{engage}$. As will be understood from the discussion above, the reader threshold engine speed $ES_{reader}$ is greater than the engine speed ES at which the sensor 152 is activated. Once the ECU 200 determines that the engine speed ES is at least equal to the reader threshold engine speed $ES_{reader}$, the method proceeds to step 460, where the RFID reader 150 is powered by the power connection P2 via the line 158.

With reference to FIG. 18, signal 160 represents the voltage of the power line 158 which powers the RFID reader 150. The RFID reader 150 is initiated at a time $t_7$ which is later than all the other signals 162, 164, 166, 168, 170 to ensure that the power requirements for operation of all the components do not exceed the power generated by the pulling of the rope 122 connected to the magneto 96. If the reader 150 was initiated at an earlier time, some of the components of the engine 26 may not be sufficiently powered to achieve continuous combustion within a single pull of the rope.

At step 460, the RFID reader 150 is activated and reads the RFID tag 148 of the key 134' to determine if the key 134' is an authorized key.

At step 470, the ECU 200 determines whether the installed key 134' is authorized for operation of the snowmobile 10. It is also contemplated that the authorization of the key 134' could be determined by the RFID reader 150 and the result transmitted to the ECU 200. As mentioned above, the determination of the authorization status of the installed key 134' is performed by comparing the decoded identification data with one or more authorized identification codes previously stored in a memory of the ECU 200. If the key 134' is determined to be authorized for operation of the snowmobile 10, the method 400 proceeds to step 480 to continue operation of the engine 26 based on the requests of the operator of the snowmobile 10. If the key 134' is determined to be unauthorized for operation of the snowmobile 10, the method proceeds to step 490.

At step 480, the ECU 200 allows operation of the engine 26 based at least in part on the operators demands. The ECU 200 accesses control maps for the particular mode of operation and the authorization of the particular operator in order to control operation of the engine 26.

At step 490, the start-up procedure of the engine 26 is terminated and the operation of the engine 26 is limited to a security limited engine speed. In the present implementation, the security limited engine speed is an engine speed ES that is lower than the CVT engagement speed $ES_{engage}$. Since the engine speed ES is limited to be lower than the CVT engagement speed $ES_{engage}$, the CVT 50 does not transmit the torque generated by the engine 26 and the snowmobile 10 is not being propelled forward. It is contemplated that the engine 26 could automatically turn off after a certain period of time following step 490, unless an authorized key 134' is provided.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:
1. A snowmobile comprising:
a frame comprising a longitudinally extending tunnel;

a fuel tank disposed on the tunnel, the fuel tank comprising a portion extending forwardly and upwardly from a top of the tunnel;
an engine connected to the frame;
a throttle body fluidly communicating with the engine;
a throttle valve disposed in the throttle body for regulating fluid flow through the throttle body into the engine, a position of the throttle valve being movable between an open position and a closed position;
a throttle operator connected to the frame to control the position of the throttle valve, the throttle operator being moveable between an idle position and a drive position; and
a throttle valve actuator operatively connected to the throttle valve and the throttle operator, the throttle valve actuator controlling the position of the throttle valve based at least in part on a position of the throttle operator, the throttle valve actuator being an electric throttle valve actuator, the throttle valve actuator being disposed longitudinally between the fuel tank and the engine, the throttle valve actuator being disposed below the portion of the fuel tank so that the portion of the fuel tank overlaps the throttle valve actuator longitudinally and laterally.

2. The snowmobile of claim 1, further comprising a seat disposed at least partly on the tunnel, the seat comprising an upper surface disposed higher than the throttle valve actuator.

3. The snowmobile of claim 2, wherein the seat further comprises a left lateral surface and a right lateral surface, the throttle valve actuator being disposed laterally between the left lateral surface and the right lateral surface.

4. The snowmobile of claim 1, wherein the frame further comprises:
an engine compartment extending forwardly from the tunnel; and
an upper structure comprising:
a rear assembly extending upwardly and forwardly from the tunnel,
a front assembly extending forwardly and downwardly from the rear assembly; and
the upper structure forming a pyramidal structure, the throttle valve actuator being disposed within the pyramidal structure.

5. A snowmobile comprising:
a frame comprising:
a longitudinally extending tunnel; and
an upper structure forming a pyramidal structure, the upper structure comprising:
a rear assembly extending upwardly and forwardly from the tunnel, the rear assembly comprising:
a rear left brace extending upwardly, forwardly and rightwardly from the tunnel; and
a rear right brace extending upwardly, forwardly and leftwardly from the tunnel; and
a front assembly extending forwardly and downwardly from the rear assembly, the front assembly comprising:
a front left brace extending upwardly, rearwardly and rightwardly from a suspension module; and
a front right brace extending upwardly, rearwardly and leftwardly from the suspension module,
the front left brace, the front right brace, the rear left brace and the rear right brace being joined together to form an apex of the pyramidal structure, a fuel tank disposed on the tunnel;
an engine connected to the frame;
a throttle body fluidly communicating with the engine;
a throttle valve disposed in the throttle body for regulating fluid flow through the throttle body into the engine, a position of the throttle valve being movable between an open position and a closed position;
a throttle operator connected to the frame to control the position of the throttle valve, the throttle operator being moveable between an idle position and a drive position; and
a throttle valve actuator operatively connected to the throttle valve and the throttle operator, the throttle valve actuator controlling the position of the throttle valve based at least in part on a position of the throttle operator, the throttle valve actuator being an electric throttle valve actuator, the throttle valve actuator being disposed longitudinally between the fuel tank and the engine, the throttle valve actuator being disposed within the pyramidal structure, the apex being disposed vertically higher than the throttle valve actuator, and at least one of the front left brace, the front right brace, the rear left brace and the rear right brace extending vertically lower than the throttle valve actuator.

6. The snowmobile of claim 1, wherein the engine comprises:
a cylinder defining a cylinder axis;
an exhaust outlet defined in a forward portion of the cylinder; and
an air inlet defined in a rearward portion of the cylinder, the throttle body fluidly communicating with the air inlet.

7. The snowmobile of claim 6, further comprising:
a primary air box fluidly connecting the throttle body to the air inlet; and
a secondary air box fluidly communicating with the throttle body and receiving air from outside the engine, at least a portion of the secondary air box being disposed above the engine, at least a portion of the secondary air box being disposed forwardly of the engine.

8. The snowmobile of claim 1, further comprising a continuously variable transmission (CVT), the CVT comprising:
a drive pulley connected to the engine and rotatable about a drive pulley rotation axis;
a driven pulley rotatable about a driven pulley rotation axis;
an endless belt coupling the driven pulley to the drive pulley,
wherein the throttle valve actuator is disposed rearward of a CVT plane containing the drive pulley rotation axis and the driven pulley rotation axis.

9. The snowmobile of claim 8, wherein at least a portion of the throttle valve actuator is disposed longitudinally within a projection of a circumferential edge of the driven pulley on a longitudinally extending vertical plane.

10. The snowmobile of claim 8, wherein at least a portion of the throttle valve actuator is disposed vertically within a projection of the circumferential edge of the driven pulley on a longitudinally extending vertical plane.

11. A snowmobile comprising:
a frame comprising a longitudinally extending tunnel;
a fuel tank disposed on the tunnel;
an engine connected to the frame;
a throttle body fluidly communicating with the engine;

a throttle valve disposed in the throttle body for regulating fluid flow through the throttle body into the engine, a position of the throttle valve being movable between an open position and a closed position;

a throttle operator connected to the frame to control the position of the throttle valve, the throttle operator being moveable between an idle position and a drive position;

a throttle valve actuator operatively connected to the throttle valve and the throttle operator, the throttle valve actuator controlling the position of the throttle valve based at least in part on a position of the throttle operator, the throttle valve actuator being an electric throttle valve actuator, the throttle valve actuator being disposed longitudinally between the fuel tank and the engine;

a continuously variable transmission (CVT) comprising:
 a drive pulley connected to the engine and rotatable about a drive pulley rotation axis;
 a driven pulley rotatable about a driven pulley rotation axis; and
 an endless belt coupling the driven pulley to the drive pulley, and a countershaft connected between the driven pulley and a gear reduction drive, wherein the throttle valve actuator is disposed longitudinally rearward of the countershaft.

12. The snowmobile of claim 11, further comprising:
a track operatively connected to the engine via the CVT; and
a sprocket engaging the track and defining a sprocket axis, wherein the throttle valve actuator is disposed longitudinally forward of the sprocket axis.

13. A snowmobile comprising:
a frame comprising:
 a longitudinally extending tunnel;
 an engine compartment extending forwardly from the tunnel; and
 an upper structure comprising:
  a rear assembly extending upwardly and forwardly from the tunnel, the rear assembly comprising:
   a rear left brace extending upwardly, forwardly and rightwardly from the tunnel; and
   a rear right brace extending upwardly, forwardly and leftwardly from the tunnel;
  and
  a front assembly extending forwardly and downwardly from the rear assembly, the front assembly comprising:
   a front left brace extending upwardly, rearwardly and rightwardly from a suspension module; and
   a front right brace extending upwardly, rearwardly and leftwardly from the suspension module,
  the upper structure forming a pyramidal structure,
   the front left brace and the front right brace defining a front face of the pyramidal structure,
   the rear left brace and rear right brace defining a rear face of the pyramidal structure,
   the front left brace and rear left brace defining a left face of the pyramidal structure,
   the front right brace and rear right brace defining a right face of the pyramidal structure,
a fuel tank disposed on the tunnel;
an engine connected to the frame;
a throttle body fluidly communicating with the engine;
a throttle valve disposed in the throttle body for regulating fluid flow through the throttle body into the engine, a position of the throttle valve being movable between an open position and a closed position;
a throttle operator connected to the frame to control the position of the throttle valve, the throttle operator being moveable between an idle position and a drive position; and
a throttle valve actuator operatively connected to the throttle valve and the throttle operator, the throttle valve actuator controlling the position of the throttle valve based at least in part on a position of the throttle operator, the throttle valve actuator being an electric throttle valve actuator,
the throttle valve actuator being disposed longitudinally between the fuel tank and the engine,
the throttle valve actuator being disposed within the pyramidal structure,
the throttle valve actuator being disposed laterally between the right and left faces of the pyramidal structure, and
the throttle valve actuator being disposed longitudinally between the front and rear faces of the pyramidal structure.

* * * * *